United States Patent
Prentice et al.

(10) Patent No.: US 11,247,615 B2
(45) Date of Patent: Feb. 15, 2022

(54) SYSTEM AND METHOD FOR MOBILE SOLAR GENERATORS

(71) Applicant: Halcyon Energy Systems, LLC, Halcyon, CA (US)

(72) Inventors: Russell A. Prentice, Arroyo Grande, CA (US); David J. McMillan, San Luis Obispo, CA (US)

(73) Assignee: Halcyon Energy Systems, LLC, Halcyon, CA (US)

( * ) Notice: Subject to any disclaimer, the term of this patent is extended or adjusted under 35 U.S.C. 154(b) by 0 days.

(21) Appl. No.: 17/196,697

(22) Filed: Mar. 9, 2021

(65) Prior Publication Data
US 2021/0284076 A1 Sep. 16, 2021

Related U.S. Application Data

(60) Provisional application No. 62/987,669, filed on Mar. 10, 2020.

(51) Int. Cl.
*B60R 11/00* (2006.01)
*H02S 10/40* (2014.01)
*H02S 30/20* (2014.01)
*H02J 7/35* (2006.01)

(52) U.S. Cl.
CPC .............. *B60R 11/00* (2013.01); *H02S 10/40* (2014.12); *H02S 30/20* (2014.12); *B60R 2011/004* (2013.01); *B60R 2011/0085* (2013.01); *H02J 7/35* (2013.01)

(58) Field of Classification Search
CPC ................................. H02S 10/40; H02S 30/20
See application file for complete search history.

(56) References Cited

U.S. PATENT DOCUMENTS

| | | | |
|---|---|---|---|
| 4,155,524 A * | 5/1979 | Marello | B64G 1/443 136/245 |
| 4,315,163 A | 2/1982 | Bienville | |
| 5,111,127 A | 5/1992 | Johnson | |
| 5,233,227 A | 8/1993 | Kajimoto et al. | |
| 5,522,943 A | 7/1996 | Spencer et al. | |
| 5,969,501 A | 10/1999 | Glidden et al. | |

(Continued)

FOREIGN PATENT DOCUMENTS

| | | |
|---|---|---|
| CN | 105375862 A | 3/2016 |
| CN | 109921721 A | 6/2019 |

(Continued)

OTHER PUBLICATIONS

Marketing Fastenright, "Preventing the Theft of Solar Panels", https://www.fastenright.com/blog/preventing-the-theft-of-solar-panels, 2019, All Pages. (Year: 2019).*

*Primary Examiner* — Daniel P Malley, Jr.
(74) *Attorney, Agent, or Firm* — Knobbe, Martens, Olson & Bear, LLP

(57) ABSTRACT

Features for a mobile solar generator. The system includes a deployable solar array using an actuator and torsion springs. The array can be locked into place after deployment. The array stows for transport of the system to remote locations. The solar panels of the array are unexposed when stowed, and secured into place using various locking mechanisms in both the stowed and deployed configurations. Tamper-resistant hardware is included in the solar array to prevent theft and damage.

8 Claims, 34 Drawing Sheets

(56) References Cited

U.S. PATENT DOCUMENTS

| | | |
|---|---|---|
| 6,111,391 A | 8/2000 | Cullen |
| 6,201,181 B1 | 3/2001 | Azzam et al. |
| 6,396,239 B1 | 5/2002 | Benn et al. |
| 6,563,040 B2 | 3/2003 | Hayden et al. |
| 6,914,418 B2 | 7/2005 | Sung |
| 7,230,819 B2 | 6/2007 | Muchow et al. |
| 7,469,541 B1 | 12/2008 | Melton et al. |
| 7,795,837 B1 | 9/2010 | Haun et al. |
| 8,254,090 B2 | 8/2012 | Prax et al. |
| 8,295,033 B2 | 10/2012 | Van Straten |
| 8,492,645 B1 | 7/2013 | Strahm |
| 9,246,035 B2 | 1/2016 | Eaton, Jr. |
| 10,371,328 B2 | 8/2019 | Poage |
| 2005/0218657 A1 | 10/2005 | Weesner et al. |
| 2006/0137348 A1 | 6/2006 | Pas |
| 2009/0079161 A1 | 3/2009 | Muchow et al. |
| 2010/0109601 A1 | 5/2010 | Coyle et al. |
| 2010/0207452 A1 | 8/2010 | Saab |
| 2011/0132353 A1 | 6/2011 | Gumm et al. |
| 2011/0176256 A1 | 7/2011 | Van Straten |
| 2012/0025750 A1 | 2/2012 | Margo |
| 2012/0042936 A1 | 2/2012 | Feichtinger et al. |
| 2012/0313569 A1 | 12/2012 | Curran |
| 2013/0039104 A1 | 2/2013 | Sharma |
| 2013/0082637 A1 | 4/2013 | Eaton et al. |
| 2013/0234645 A1 | 9/2013 | Goei et al. |
| 2013/0340807 A1 | 12/2013 | Gerwing et al. |
| 2015/0013750 A1 | 1/2015 | Meppelink et al. |
| 2015/0090315 A1 | 4/2015 | Spisak |
| 2015/0349699 A1* | 12/2015 | Chambe .......... H02S 30/20 136/246 |
| 2016/0241036 A1 | 8/2016 | Wolter |
| 2016/0285404 A1 | 9/2016 | Aikens et al. |
| 2018/0076757 A1 | 3/2018 | Gross et al. |
| 2018/0254740 A1 | 9/2018 | Corio |

FOREIGN PATENT DOCUMENTS

| | | |
|---|---|---|
| JP | 3169441 U | 7/2011 |
| WO | WO 2007/039732 A2 | 4/2007 |
| WO | WO 2014/096945 A2 | 6/2014 |
| WO | WO 2016/059582 A1 | 4/2016 |
| WO | WO 2016/073013 A1 | 5/2016 |
| WO | WO 2016/091711 A1 | 6/2016 |
| WO | WO 2017/165913 A1 | 10/2017 |

* cited by examiner

FIG. 6D
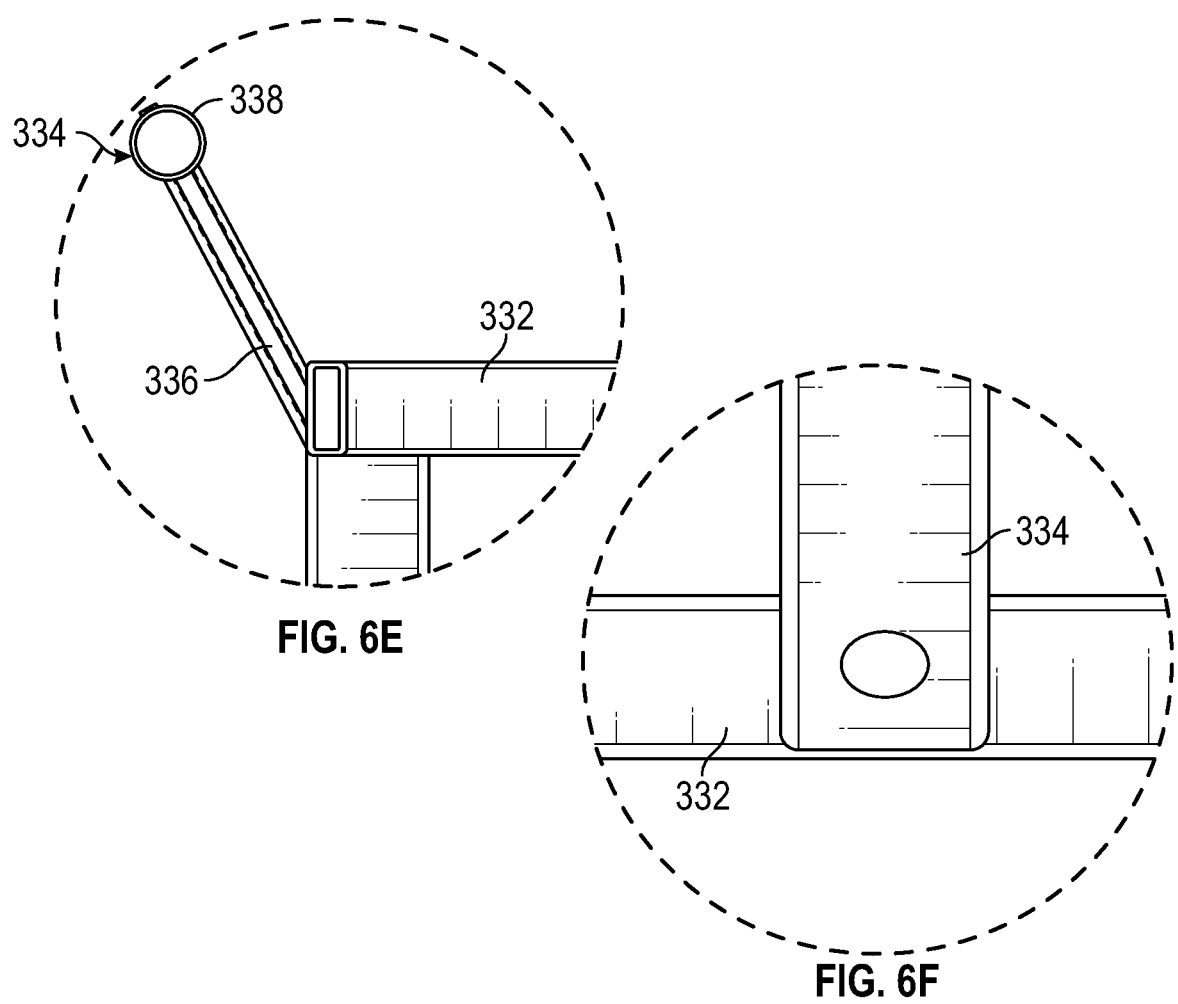
FIG. 6E
FIG. 6F

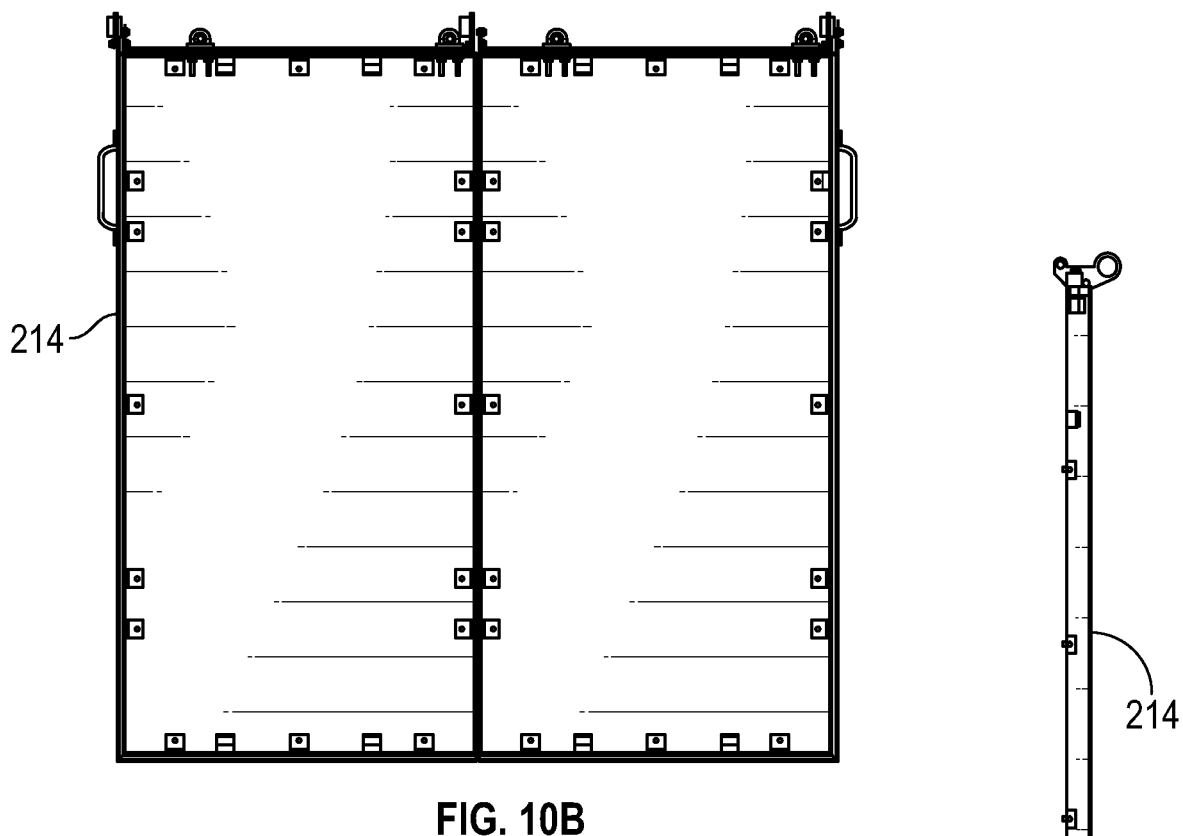
FIG. 10B
FIG. 10E
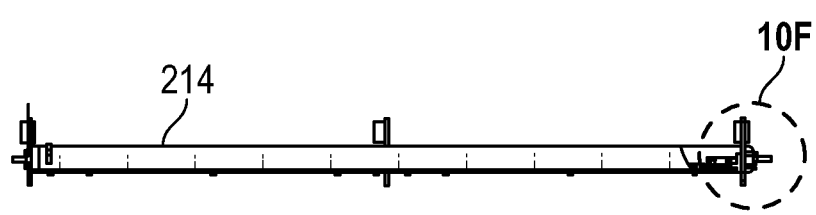
FIG. 10C
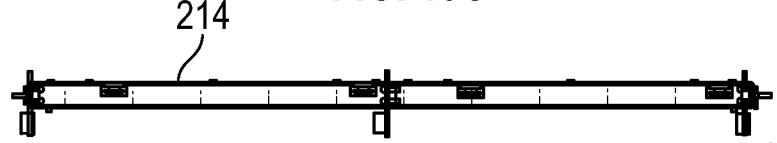
FIG. 10D
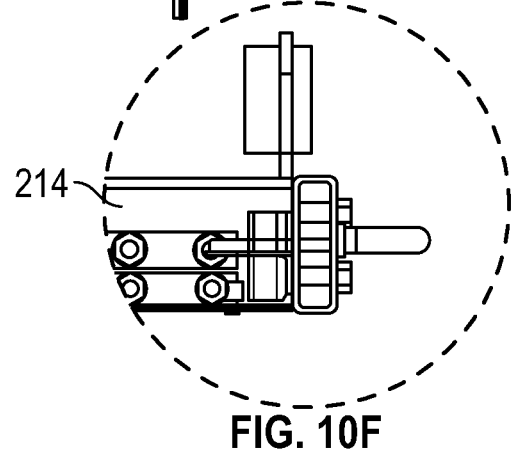
FIG. 10F

SYSTEM AND METHOD FOR MOBILE SOLAR GENERATORS

INCORPORATION BY REFERENCE TO ANY PRIORITY APPLICATIONS

Any and all applications for which a foreign or domestic priority claim is identified in the Application Data Sheet as filed with the present application, are hereby incorporated by reference in their entirety under 37 CFR 1.57. For example, this application claims the benefit of priority under 35 U.S.C. § 119(e) of U.S. Provisional Application No. 62/987,669, filed on Mar. 10, 2020, and entitled "SYSTEM AND METHOD FOR MOBILE SOLAR GENERATORS," the entire disclosure of which is incorporated herein by reference in its entirety and forms a part of this specification for all purposes.

BACKGROUND

Technical Field

The development relates to power generation, in particular to systems and methods for mobile solar-powered generators or "solar generators".

Description of the Related Technology

Providing power to remote locations can enable life-sustaining and other vital systems. However, many remote regions in the world are without access to a standard energy grid and the power that comes from it. For example, it is expensive to run power lines from energy production factories to remote locations. There is therefore a need to provide power for remote and other locations.

SUMMARY OF CERTAIN INVENTIVE ASPECTS

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for mobile solar power systems.

This section of the disclosure describes non-limiting examples of some embodiments. Other embodiments of the disclosed systems and methods may or may not include the features described herein. Moreover, disclosed advantages and benefits can apply only to certain embodiments and should not be used to limit the disclosure. The innovations described throughout this disclosure may be embodied or carried out in a manner that achieves or optimizes one advantage or group of advantages as taught herein without necessarily achieving other advantages as may be taught or suggested herein. Any of the below aspects can be combined with each other as suitable, and/or with any of the other features described in any of the sections herein. The present disclosure contemplates combining one or more features of each of the aspects in each and every suitable combination.

Described herein are features for mobile solar-powered generators or "solar generators." The technology provides the necessary levels of efficient, sustained power supply along with the required safety and security needed in remote locations. Further, an economical and durable mechanical platform with mobility and secure storage capabilities is provided. The system includes solar panels that collect solar energy from the sun which are connected to power electronics, such as charge controllers and inverters to convert the energy to electrical power that is stored in batteries and used to run electrical components, for example to provide electrical power for lighting, well pumps, water treatment, and other systems in remote locations. The system includes a mobile platform, such as a trailer, for transport to and from remote locations. The mobility of the system allows for transportation over rough terrain and movement to where the power is needed on a daily, weekly or monthly basis. Various security and storage features of the system ensure the security, safety, and reliability of the unit, for example by mitigating risks of vandalism during transportation or storage. The solar panels deploy from a secure, protected, stowed configuration to a deployed configuration using spring-loaded hinges and other mechanisms. Some of the features of the system include a folding mechanism, solar panels that are secure and not exposed when stowed, solar panels that secure when deployed to prevent theft or damage, an integrated mobile platform, springs to offset the weight of the folding mechanism, a common hinge for both folding and tilting, and internal components such as the generator and others that are secured when the panels are deployed. Other features form part of this disclosure, as further described herein. Some of the prominent aspects are described below.

In one aspect, a mobile, solar-powered electrical generation system is described. The system comprises a mobile platform and a base. The mobile platform has two or more wheels and is configured to attach to a vehicle to tow the mobile platform. The base is carried by the mobile platform and comprises a closed volume enclosing power electronics, the base comprising a plurality of solar modules that at least partially form the closed volume. Each solar module comprises a base frame, two or more panel frames, and two or more solar panels. The base frame comprises frame members and sidewalls supported by the frame members, with each base frame supported by the mobile platform. The two or more panel frames are rotatably attached to each other and supported by the base frame. Each of the two or more solar panels is supported by a respective panel frame. The two or more panel frames are configured to rotate to deploy from a stowed configuration where solar energy collecting sides of the two or more solar panels are not exposed, to a deployed configuration where the two or more solar panels are exposed and form a planar solar array configured to collect solar energy from the sun. Each solar module is configured to connect with an other solar module to modularly expand the base to a desired size, with each base frame of each solar module supported by the mobile platform, and the two or more panel frames of each solar module forming a solar panel support frame that supports the planar solar array in the deployed configuration.

Various embodiments of the various aspects may be implemented. For example, the system may further comprise a primary hinge rotatably connecting first and second panel frames of the two or more panel frames to each other, and where the primary hinge also is rotatably connecting the solar panel support frame to the base such that the deployed planar solar array can rotate about the primary hinge relative to the base. The primary hinge may further comprise rigid arms extending away from the base and comprising openings therethrough, and a tube extending through the openings of the rigid arms, such that the rigid arms are rotatably mounted to the tube to connect the primary hinge to the base. The primary hinge may further comprise a plurality of brackets attached to opposing edges of the first and second panel frames with each bracket having an opening extending therethrough, where the tube extends through the respective opening of the plurality of brackets to rotatably connect the first panel frame to the second panel frame. The first bracket of the plurality of brackets may be attached to the first panel frame, a second bracket of the plurality of brackets may be attached to the second panel frame, and the first and second brackets may be offset from each other in a direction parallel to an axis of rotation of the primary hinge. The system may further comprise a secondary hinge rotatably connecting the second panel frame to a third panel frame of the two or more panel frames, the secondary hinge comprising a plurality of brackets and a tube, where the plurality of brackets are attached to opposing edges of the second and third panel frames and each bracket has an opening extending therethrough, and where the tube extends through the respective opening of the plurality of brackets to rotatably connect the second panel frame to the third panel frame. The system may further comprise a linear actuator attached to the base and to one or more panel frames of the two or more panel frames, the linear actuator configured to extend a selected distance to rotate the planar solar array about the hinge to a selected angle to face the sun. The system may further comprise a locking mechanism comprising a pin and first and second brackets extending from respective opposing edges of two adjacent panel frames of the two or more panel frames, the brackets having openings configured to align and to receive the pin therethrough to lock the position of the two adjacent panel frames relative to each other in the deployed configuration. The base may comprise three solar modules, and the two or more panel frames of each solar module may comprise two solar panels.

In another aspect a mobile, solar-powered electrical generation system is described. The system comprises a mobile platform, a base, and a linear actuator. The mobile platform comprises two or more wheels and is configured to attach to a vehicle to tow the mobile platform. The base is carried by the mobile platform and comprises a closed volume enclosing power electronics, with the base comprising a plurality of solar modules that at least partially form the closed volume, where each solar module is configured to connect with an other solar module to modularly expand the base to a desired size. Each solar module comprises a base frame, two or more panel frames, two or more solar panels, and a torsion spring. The base frame comprises frame members and sidewalls supported by the frame members, with each base frame supported by the mobile platform. The two or more panel frames are rotatably attached to each other and supported by the base frame to form a solar panel support frame, with at least one of the panel frames of the two more panel frames rotatably connected to the base about a hinge. Each of the two or more solar panels is supported by a respective panel frame of the two or more panel frames, where the two or more panel frames are configured to rotate to deploy from a stowed configuration where solar energy collecting sides of the two or more solar panels are not exposed, to a deployed configuration where the two or more solar panels form a planar array configured to collect solar energy from the sun. The torsion spring is connecting two adjacent panel frames of the two or more panel frames, with the torsion spring configured to bias the two adjacent panel frames into the deployed configuration. The linear actuator is attached to the base and to a panel frame of the two or more panel frames, with the linear actuator configured to extend a selected distance to rotate the planar array about the hinge to a selected angle to face the sun.

Various embodiments of the various aspects may be implemented. For example, the hinge may be a primary hinge rotatably connecting first and second panel frames of the two or more panel frames to each other, and where the primary hinge also is rotatably connecting the solar panel support frame to the base such that the deployed planar solar array can rotate about the primary hinge relative to the base, and the system may further comprise a secondary hinge rotatably connecting the second panel frame to a third panel frame of the two or more panel frames. The system may further comprise a capture device projecting outward from opposing edges of the two adjacent panel frames, where opposite ends of the torsion spring attach to respective captures devices of the two adjacent panel frames. The capture device may comprise a central catch and a retainer, the central catch having an opening therethrough, the retainer extending about the central catch, and where the opening of the central catch is configured to receive and secure an end of the torsion spring therein. The system may further comprise two or more protective sheets and electrical wiring. Each protective sheet may be affixed to a rear side of a respective panel frame of the two or more panel frames, where the two or more protective sheets are mounted with tamper-resistant hardware on the rear side of the respective panel frame that is opposite from the solar panel supported by the respective panel frame. The electrical wiring may electrically connect the solar panel to a charge controller and battery, the wiring routed between the protective sheet and the respective panel frame to prevent access to the wiring or to solar panel mounting hardware. The system may include a locking mechanism to lock the position of the two adjacent panel frames relative to each other in a planar configuration.

In another aspect, a mobile, solar-powered electrical generation system is described. The system comprises one or more solar modules. Each solar module comprises a base frame, two or more panel frames, two or more solar panels, and a primary hinge. The base frame comprises frame members and sidewalls supported by the frame members. The two or more panel frames are rotatably attached to each other to form a solar panel support frame and are supported by the base frame. The two or more solar panels are each supported by a respective panel frame, where the two or more panel frames are configured to rotate to deploy from a stowed configuration where solar energy collecting sides of the two or more solar panels are not exposed, to a deployed configuration where the two or more solar panels are exposed and form a solar array configured to collect solar energy from the sun. The primary hinge is rotatably connecting first and second panel frames of the two or more panel frames to each other, and the primary hinge also is rotatably connecting the solar panel support frame to the base such that the deployed planar solar array can rotate about the primary hinge relative to the base.

Various embodiments of the various aspects may be implemented. Each solar module may be configured to connect with an other solar module to modularly form a base of a desired size. The primary hinge may further comprise rigid arms extending away from the base frame and comprising openings therethrough, and a tube extending through the openings of the rigid arms, such that the rigid arms are rotatably mounted to the tube to connect the primary hinge to the base frame. The primary hinge may further comprise a plurality of brackets attached to opposing edges of the first and second panel frames and each bracket having an opening extending therethrough, where the tube extends through the respective opening of the plurality of brackets to rotatably connect the first panel frame to the second panel frame. A first bracket of the plurality of brackets may be attached to the first panel frame, a second bracket of the plurality of brackets may be attached to the second panel frame, and the first and second brackets may be offset from each other in a direction parallel to an axis of the tube. The system may further comprise a secondary hinge rotatably connecting the second panel frame to a third panel frame of the two or more panel frames, the secondary hinge may comprise a plurality of brackets and a second tube, where the plurality of brackets are attached to opposing edges of the second and third panel frames and each bracket may have an opening extending therethrough, and the second tube may extend through the respective opening of the plurality of brackets to rotatably connect the second panel frame to the third panel frame. The system may further comprise a linear actuator attached to the base frame and to one or more panel frames of the two or more panel frames, with the linear actuator configured to extend a selected distance to rotate the planar solar array about the primary hinge to a selected angle relative to the base frame.

In another aspect, a mobile, solar-powered electrical generation system is described. The system comprises a mobile platform, lockable lifting supports and a base. The mobile platform has two or more wheels and is configured to attach to a vehicle to tow the mobile platform. The lockable lifting supports are configured to raise the mobile platform into a raised configuration such that the two or more wheels do not contact the ground. The base is carried by the mobile platform and comprises a lockable closed volume enclosing power electronics, such as a charge controller, an inverter, and a battery, with the base comprising a plurality of solar modules that at least partially form the closed volume, where each solar module is configured to connect with an other solar module to modularly expand the base to a desired size. Each solar module comprises a base frame, two or more panel frames, two or more solar panels, and two or more protective sheets. The base frame comprises frame members and sidewalls supported by the frame members, with each base frame supported by the mobile platform. The two or more panel frames are rotatably attached to each other by one or more hinges and supported by the base frame. Each of the two or more solar panels is supported by a respective panel frame, where the two or more panel frames are configured to rotate via the one or more hinges to deploy from a stowed configuration where solar energy collecting sides of the two or more solar panels are not exposed, to a deployed configuration where the two or more solar panels form a deployed planar solar array configured to collect solar energy from the sun. The deployed planar solar array is rotatably connected to the base via the one or more hinges to allow the deployed planar solar array to rotate relative to the base. Each of the two or more protective sheets is affixed to a rear side of a respective panel frame of the two or more panel frames, where the two or more protective sheets are mounted with tamper-resistant hardware on the rear side of the respective panel frame that is opposite from the solar panel supported by the respective panel frame, and electrical wiring electrically connecting the solar panel to the generator and routed between the each protective sheet and the respective panel frame to prevent access to the wiring or to solar panel mounting hardware.

Various embodiments of the various aspects may be implemented. The one or more hinges may comprise a primary hinge rotatably connecting first and second panel frames of the two or more panel frames to each other, and the primary hinge may also be rotatably connecting the two or more panel frames to the base such that the deployed planar solar array can rotate about the primary hinge relative to the base. The primary hinge may further comprise rigid arms extending away from the base, where each rigid arm comprises a first opening therethrough, a plurality of first brackets attached to opposing edges of the first and second panel frames, where each first bracket comprises a second opening therethrough, and a first tube extending through the first and second openings. The one or more hinges may further comprise a secondary hinge rotatably connecting the second panel frame to a third panel frame of the two or more panel frames, with the secondary hinge comprising a plurality of second brackets attached to opposing edges of the second and third panel frames, where each second bracket comprises a third opening therethrough, and a second tube extending through the third openings. The system may further comprise a locking mechanism comprising a pin and first and second brackets extending from respective opposing edges of two adjacent panel frames of the two or more panel frames, with the brackets having openings configured to align and to receive the pin therethrough to lock the position of the two adjacent panel frames relative to each other in the deployed configuration. The system may further comprise a torsion spring connecting two adjacent panel frames of the two or more panel frames, the torsion spring configured to bias the two adjacent panel frames into the deployed configuration, and a linear actuator attached to the base and to one or more panel frames of the two or more panel frames, the linear actuator configured to extend to rotate the planar array about the one or more hinges in a first direction and to retract to rotate the planar array about the one or more hinges in a second direction opposite the first direction.

In another aspect, a mobile solar generator comprises a mobile platform, a base, a charge controller, an inverter, a battery, a solar panel support frame, one or more solar panels, a hinge, an actuator, and a lock. The mobile platform has tires for transportation of the system. The base is secured to the mobile platform and includes a secure volume for storing the charge controller, inverter, and battery therein. The frame includes two or more panel frames, that each support one or more of the solar panels, and that are rotatably attached to each other and configured to deploy from a stowed configuration where the solar panels are not exposed to a deployed configuration where the solar panels form a planar array configured to collect solar energy from the sun. The hinge comprises a torsion spring attached to two adjacent panel frames of the two or more panel frames and biases the panel frames toward the planar or partially deployed configuration. The actuator tilts the horizontal planar array at an angle with respect to gravity. The lock secures the deployed array in the deployed configuration.

In some embodiments, arms extend outward away from the base and rotatably receive a tube connected to the frame. The frame may rotate about an axis along the tube via the biasing force from the springs. The array may partially deploy to a flat, horizontal orientation. The lock, such as a locking pin, may be inserted through brackets that are rotatably connected to the tube and fixedly attached to adjacent panel frames to prevent relative rotation of adjacent panel frames. The actuator may be a linear actuator. The actuator may be a hydraulic manual linear actuator. Further locking devices may be included to secure the array in the stowed configuration and secure components stored within the base. Tamper-resistant hardware may be included in the panels to prevent theft and damage when in the stowed configuration.

BRIEF DESCRIPTION OF THE DRAWINGS

The foregoing and other features of the present disclosure will become more fully apparent from the following description and appended claims, taken in conjunction with the accompanying drawings. In the following detailed description, reference is made to the accompanying drawings, which form a part hereof. Understanding that these drawings depict only several embodiments in accordance with the disclosure and are not to be considered limiting of its scope, the disclosure will be described with additional specificity and detail through use of the drawings. In the drawings, similar symbols typically identify similar components, unless context dictates otherwise. It will be understood that elements illustrated in the figures are not necessarily drawn to scale. Further, the illustrative embodiments described in the detailed description, drawings, and claims are not meant to be limiting. The aspects of the present disclosure, as generally described herein, and illustrated in the drawings, can be arranged, substituted, combined, and designed in a wide variety of different configurations, all of which are explicitly contemplated and make part of this disclosure. Other embodiments may be utilized, and other changes may be made, without departing from the spirit or scope of the subject matter presented here. For example, it will be understood that certain embodiments can include more elements than illustrated in a drawing and/or a subset of the elements illustrated in a drawing. As another example, some embodiments can incorporate any suitable combination of features from two or more drawings.

FIGS. 6A-6F are various views of the base frame and hinge arms of the solar generator of FIGS. 1A-1C.

FIGS. 10A-11D are perspective and close-up views of the lower panel frame of the solar generator of FIGS. 1A-1C.

DETAILED DESCRIPTION

The following detailed description is directed to certain specific embodiments of the development. Reference in this specification to "one embodiment," "an embodiment," "in some embodiments," or similar phrases, means that a particular feature, structure, or characteristic described in connection with the embodiment is included in at least one embodiment of the invention. The appearances of such phrases in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the development may include several novel features, no single one of which is solely responsible for its desirable attributes or which is essential to practicing the invention described herein.

Figure 1A:
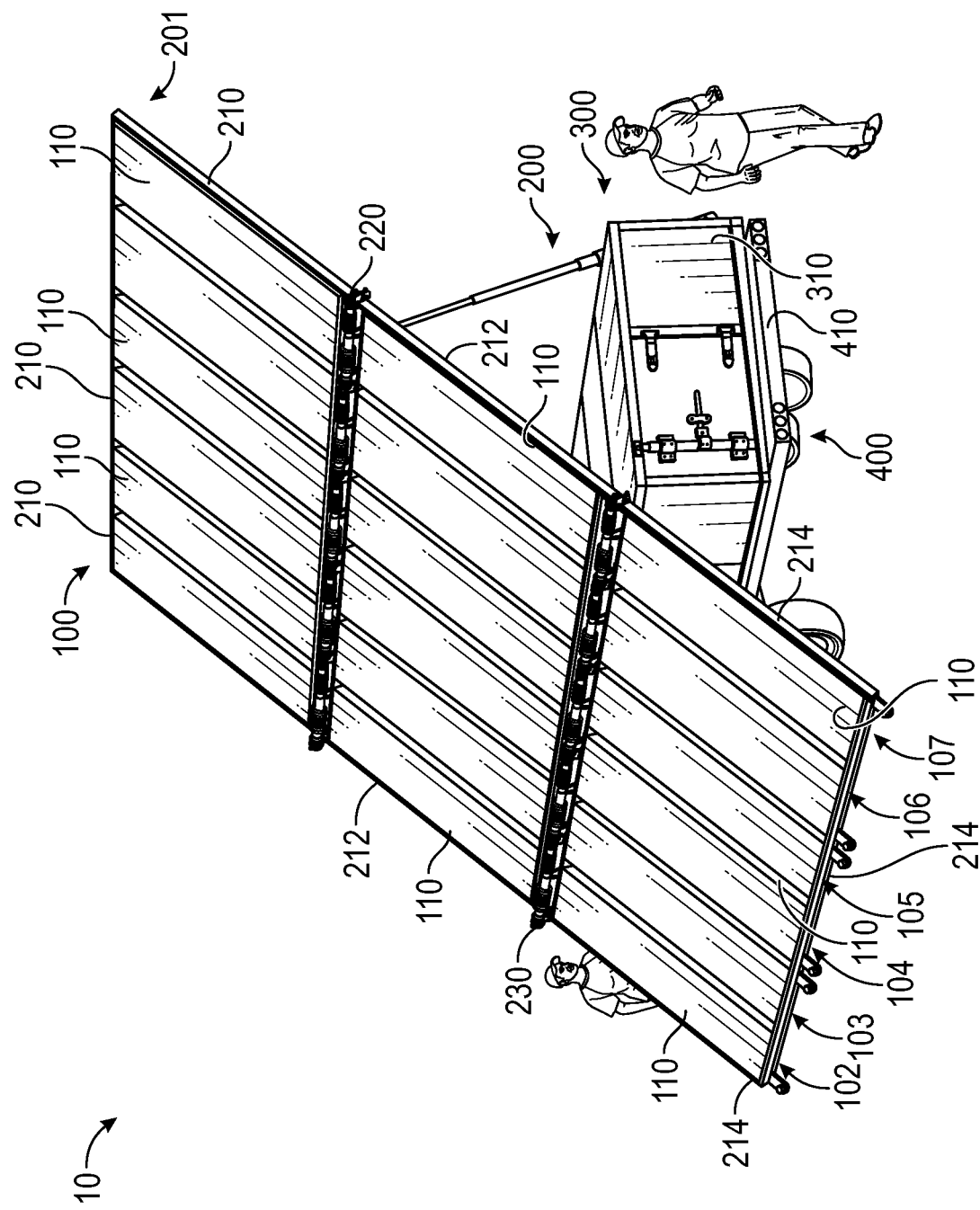
FIGS. 1A-1C are various perspective views of an embodiment of a mobile solar generator with the solar panels in a deployed configuration.
Figure 1B:
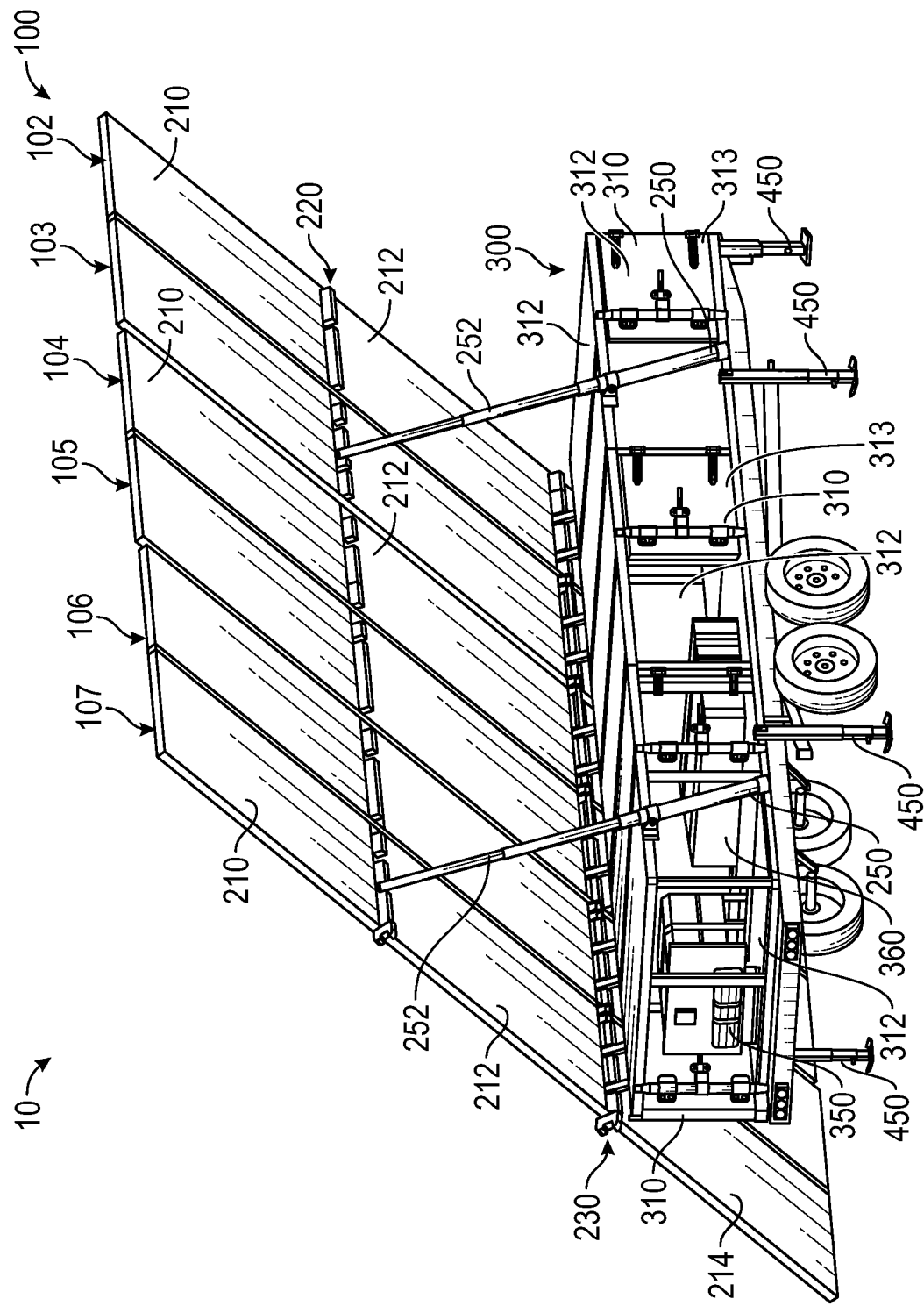
Figure 1C:
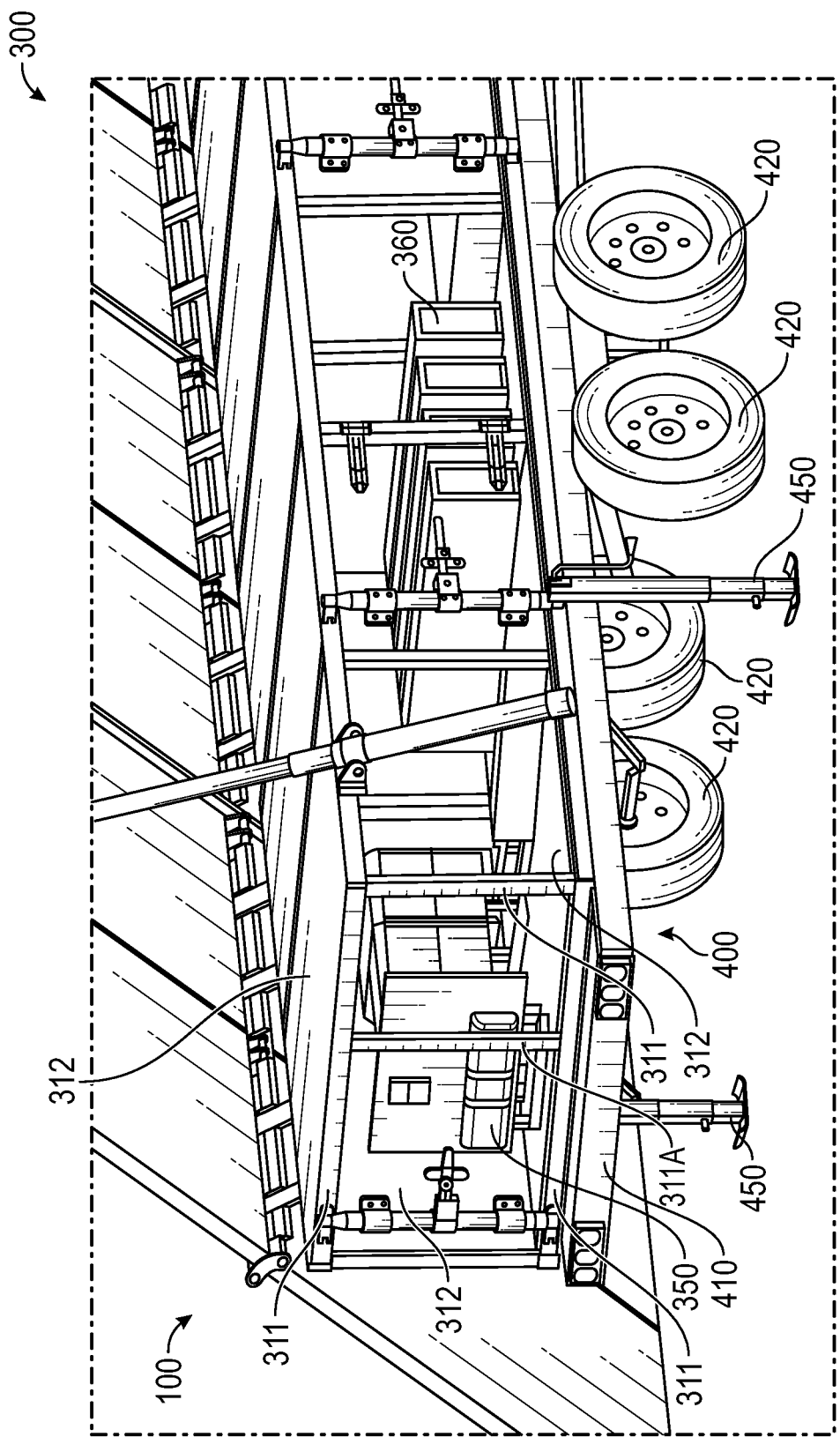

An embodiment of a mobile solar power generation system 10, or solar generator, is shown and described with respect to FIGS. 1A-14C. In particular, FIGS. 1A-1C are various perspective views of an embodiment of the system 10 with solar panels 110 in a deployed configuration. FIGS. 2A-2D are various views of the system 10 in a stowed configuration. FIGS. 3A-3F, FIGS. 4A-4C, and FIGS. 5A-5D are various views of a solar module 120 used in the system 10 and shown respectively in stowed, partial deployed, and deployed configurations.

Further, FIGS. 6A-14C are various views of structures and components of the solar generator system 10. In particular, FIGS. 6A-6D are various views of a frame 330 for the solar module 120 having primary hinge arms 334. FIGS. 7A-14C are various views of solar panel support frames and hinges used to support and deploy the solar panels 110 in the system 10.

The system 10 is configured to supply power to both off grid and grid-tied systems. Power for the system 10 is provided by photo-voltaic solar panels 110. The system 10 provides for simple and less expensive manufacturing of the parts and assembly and results in a robust, modular, and secure platform for providing power to remote locations. The power may be stored in one or more batteries for later use. In some embodiments, the system 10 may include electrical plugs or outlets for providing electricity to various electrical components, such as electrical devices, mobile phones, water treatment systems, etc.

The system 10 is towed by a mobile platform, such as the trailer 400 as shown in FIGS. 1A-2D, to the location of deployment. The trailer 400 includes a frame 410 that extends from a front end, configured for connecting to a vehicle, to a rear end to support the solar modules 120. The trailer 400 includes tires 420 for mobility when being pulled by a vehicle. The trailer may include supports 450 for lifting the trailer 400 and tires 420 off the ground after the system 10 has been deployed to its destination. The supports 450 may include locking features to secure the system 10 off the ground and thereby prevent theft by prevention of towing the trailer 400 away. The locking features and supports 450 may include tamper-resistant hardware. The lifting supports 450 may selectively be raised and locked in position, for example hydraulically, mechanically, etc.

On the trailer 400 is affixed a base 300 made up of at least one, but typically multiple, solar modules, such as the three solar modules 120, 122, 124 in the embodiment described herein. Each solar module 120 is comprised of a at least partially enclosed base frame 310, which holds the power electronics and is used to support a primary hinge 230. The modules 120 connect together to form an enclosed volume, which may be continuous or portioned off by sidewalls 312. Each solar module 120 is comprised of the base frame 310, a portion of the primary hinge 230 and a portion of the solar panel support frame 201. The base 300 can mount to the trailer 400. In particular, the base 300 can be fixedly coupled to the frame 410. The tires 420 can be mounted to the frame 410. In some embodiments, the base 300 can be mounted opposite the tires 420. The base 300 can be welded to the frame 410. In some embodiments, the base 300 may be secured to the frame 410 using tamper-resistant hardware. The base 300 can be fixedly coupled to solar modules 120, 122, 124. The base frames 310 can have frame members and sidewalls. The sidewalls can be supported by the frame members. The frame members can be supported by the trailer 400 and in particular by the frame 410.

A solar array 100 is stowed on the system 10 with the panels 110 having the solar panel cells facing inward and not exposed to the outside. The solar array 100 deploys from the stowed configuration shown in FIGS. 2A-2D, to the deployed configuration shown in FIGS. 1A-1C, and can stow back from the deployed to the stowed configuration. The array 100 includes the solar panels 110. As shown, there may be eighteen solar panels 110, with six solar panels 110 per solar module 120. There may be one or more solar panels supported by a single panel frame. As shown each panel frame supports two solar panels thereon. The solar panels 110 may deploy into six columns 102, 103, 104, 105, 106, 107 as shown. There may be one, two, three, four, five, six, seven, eight, nine, or more columns. The panel frames 110 are each split into two groupings of solar panels per supporting panel frame 210, 212, 214. In some embodiments, there may be one, two or more solar panels per panel frame 210, 212, 214. The panel frames 210, 212, 214 define the three rows of solar panels 110. In some embodiments, there may be one, two, three, four or more rows of solar panels. In some embodiments, the upper and lower panel frames 210 and 214 may be identical panel frames but oriented differently, to save on costs and simplify manufacturing.

A deployment system 200 deploys the array 100. The deployment system 200 includes an actuator 250, the primary hinge 230, and the secondary hinge 220. The system 200 may also include various locking features further described herein. The solar modules 120 each have three panel frames 210, 212, 214 (that together form part of the overall frame 201) which rotate and stow such that the panels are secure and resistant to vandalism and defacing during storage and transportation. The top panel frame 210 orients the upper most panels 110 downward so that they are not exposed (cells not facing up) when the system 10 is in its folded configuration. The primary hinge 230 is used to rotate the lower panel frames 214 relative to the middle panel frames 212. The secondary hinge 220 at the opposite side of the solar panel support frame 201 from the primary hinge 230 is used to rotate the top panel frames 210 relative to the middle panel frames 212. The panel frames may be rotated inward to stow, our outward to deploy. By rotating inward, all panel frames 210, 212, 214 lay on top of one another for transportation and storage. This facilitates compactness and security of the mobile solar generators 10 for transportation and storage. By rotating outward, the panel frames form a planar array. The entire planar array can be rotated about the primary hinge 230 to orient the planar array as desired. The primary hinge 230 thus serves two rotation functions: rotating individual panel frames relative to each other, but also rotating the entire deployed planar array. The primary hinge 230 and secondary hinge 220 may have similar hardware for rotating the respective panels relative to each other, while the primary hinge 230 may have additional hardware to allow for rotation of the entire array, as further described herein.

Figure 4A:
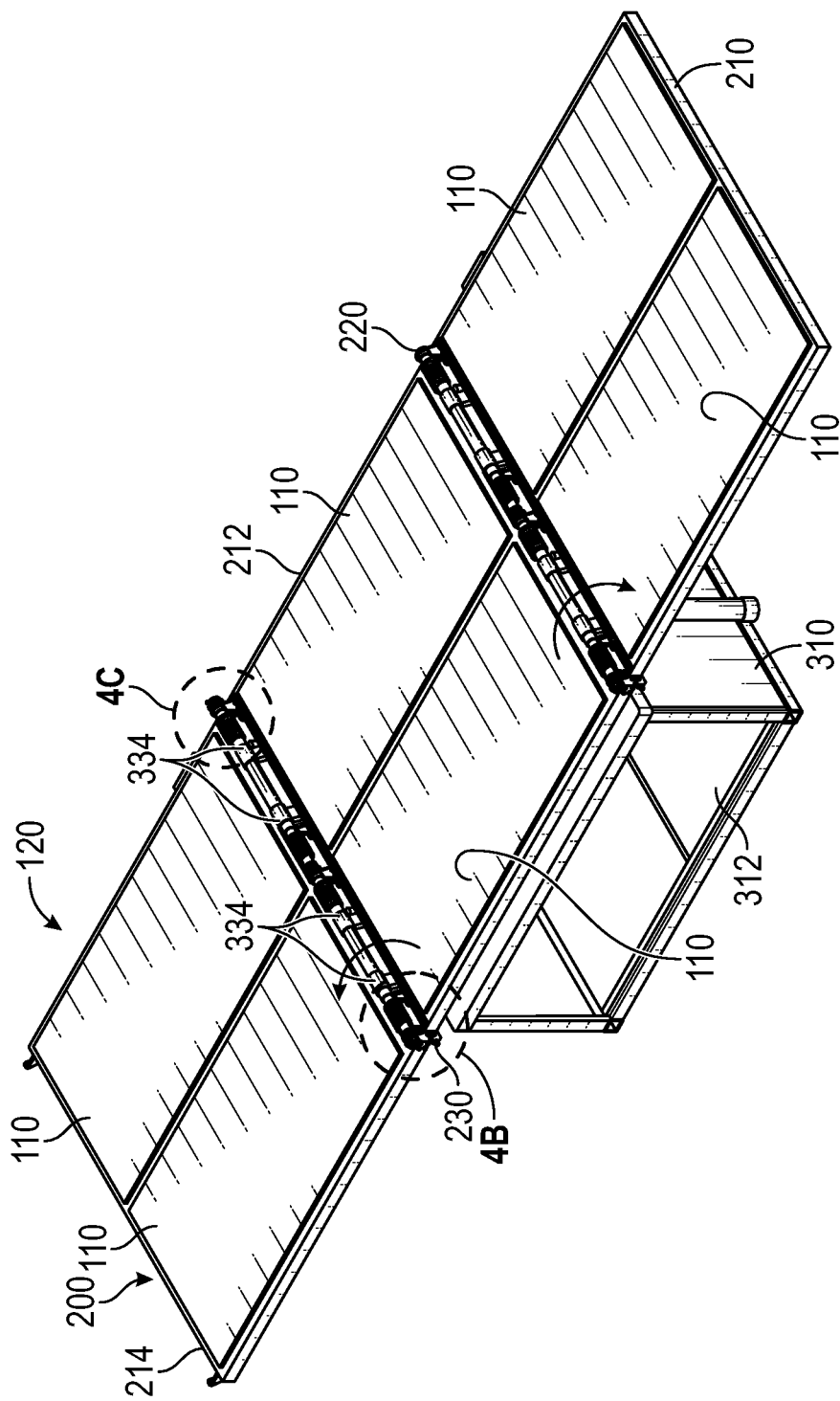
FIGS. 4A-4C are various views of the solar module of FIGS. 3A-3F and shown in a partial deployed configuration.

The middle panel frame 212 is hingedly or rotatably attached to the lower panel frame 214 via the primary hinge 230 and hingedly or rotatably attached to the upper panel frame 210 via the secondary hinge 220. In the stowed configuration, shown in FIGS. 2A-2D, the panel frames 210, 212, 214 are folded together to form a flat "sandwich" orientation for a low-volume storage configuration. FIG. 4A shows a partial deployed configuration of the panel frames 210, 212, 214. During deployment, the lower panel frame 214 rotates outward from the middle panel frame 212 and then the upper panel frame 210 rotates outward from the middle panel frame 212 to the partial deployed configuration. In some embodiments, the upper panel frame 210 rotates outward from the middle panel frame 212 and then the lower panel frame 214 rotates outward from the middle panel frame 212.

The system may include the primary hinge 230 rotatably connecting the first and second panel frames of the two or more panel frames to each other. The primary hinge 230 may also rotatably connect the solar panel support frame 201 to the base such that the deployed planar solar array can rotate about the primary hinge 230 relative to the base.

In the deployed configuration the solar energy collecting sides of the solar panels 110 are exposed. The solar panels can form a planar solar array when deployed. In the stowed configuration, the solar panels 110 face inwards. The inward facing panels 110 are thereby protected for transportation and storage. Each solar module 120, 122, 124 may be configured to connect with an other solar module 120, 122, 124 to modularly expand the base 300 to a desired size, with each base frame 310 of each solar module 120, 122, 124 configured to connect with an other base frame 310 of the other solar module 120, 122, 124. The two or more panel frames of each solar module 120, 122, 124 may be configured to connect with respective panel frames of the other solar module 120, 122, 124 to form the solar panel support frame 201 that supports the planar solar array made up of the two or more solar panels of each solar module in the deployed configuration.

Figure 5A:
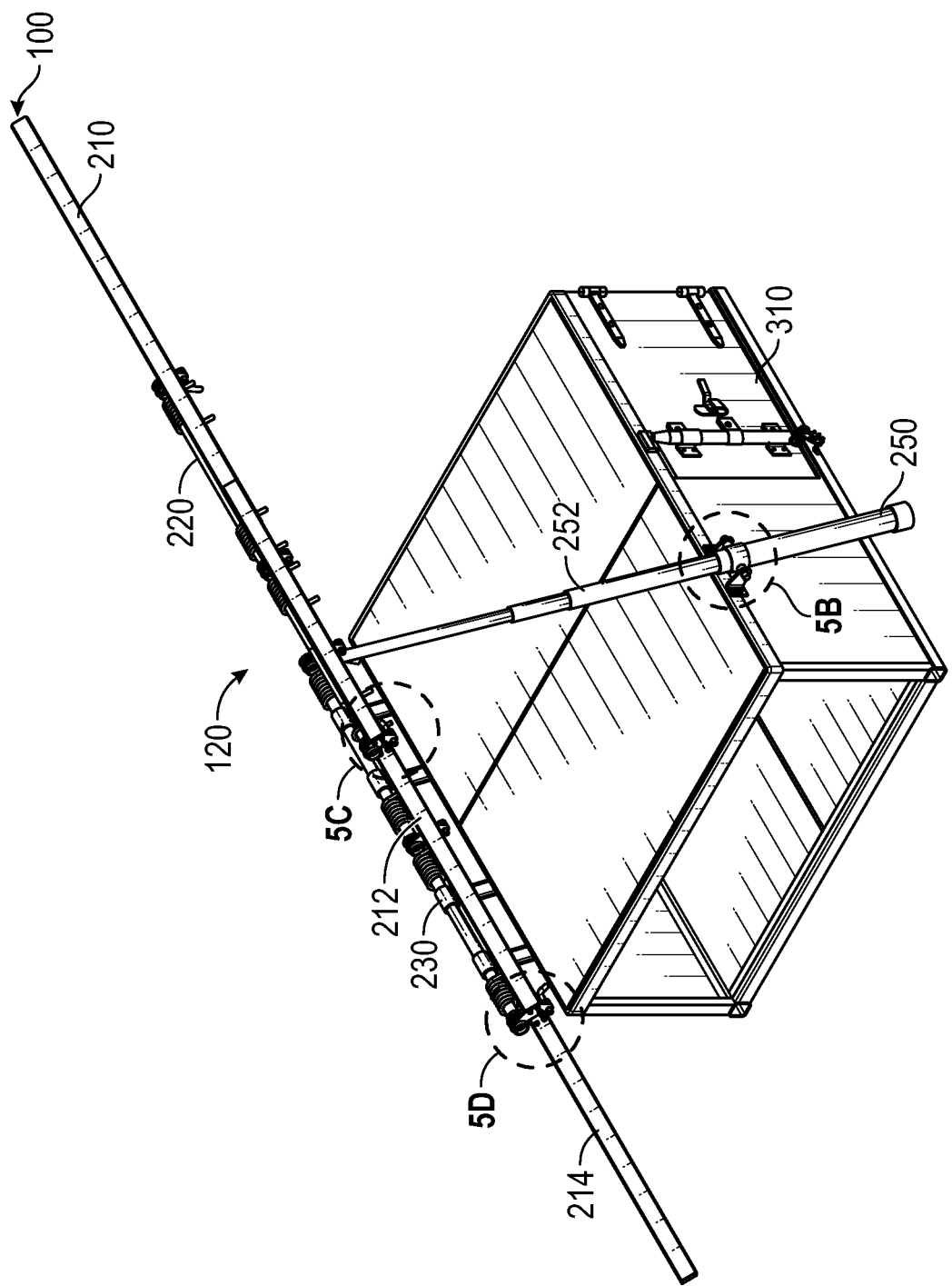
FIGS. 5A-5D are various views of the solar module of FIGS. 3A-3F and shown in a deployed configuration.
Figure 5B:
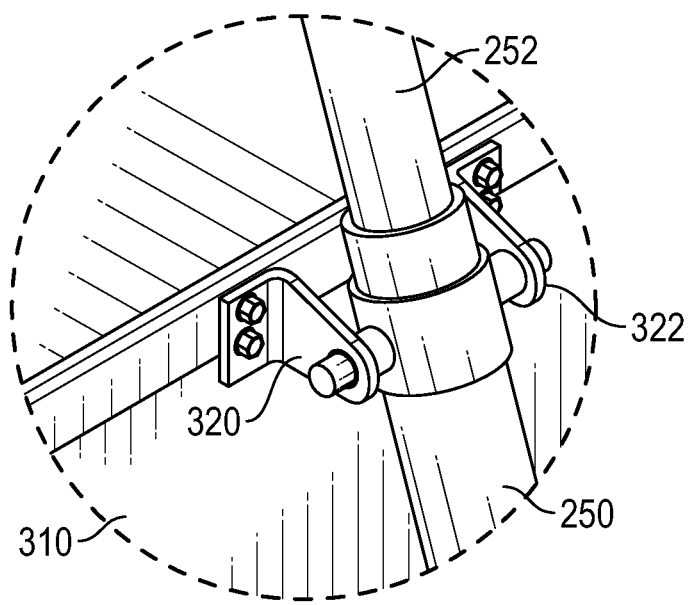

The actuator 250 tilts the deployed array 100 into the deployed orientation shown in FIGS. 1A-1C. As shown, there may be two actuators 250. In some embodiments, there may be one, three, four or more actuators 250. The actuator 250 tilts the solar panel support frames 201. The actuator 250 is linearly actuated. The linear actuator 250 affixes to the base frame 310 of the module 120 on one end and the solar panel support frame 201 on the other end. The linear actuator 250 may be hydraulically, electrically, or manually actuated. A telescoping arm 252 is extended and retracted by the actuator 250 to respectively tilt and un-tilt the array 100. As shown in FIG. 5B, the actuator 250 is connected to the base frame 310 via brackets 320, 322.

The actuator 250 may be installed on one or more of the modules 120. The actuator 250 may be omitted from one or more modules 120, for example if other means of tilting are provided or if the other panel frames provide the rotation. As shown, only the outer modules 120 have the actuator 250 installed, while the middle module 120 rotates along with the outer fame panels due to the mechanical connection of the frame members. Another example is if the system 10 comprised only two solar modules 120. One of these solar modules 120 would include the actuator 250 or other tilting mechanism and the second module 120 would not require a tilting mechanism if the solar panel support frame is rigidly affixed to the first solar module 120 which includes the actuator 250. This modularity allows for a reduction in cost due to the use of fewer tilting mechanisms when multiple solar modules 120 are used in a single system 10. The actuator 250 used to raise and lower one end of the solar panel support frame 201 helps orient the solar panels 110 at an optimum angle of incidence with respect to the sun to improve solar panel energy capture efficiency. The use of two hinges 220, 230 to connect the three panel frames 210, 212, 214 together reduces fabrication complexity.

Figure 4B:
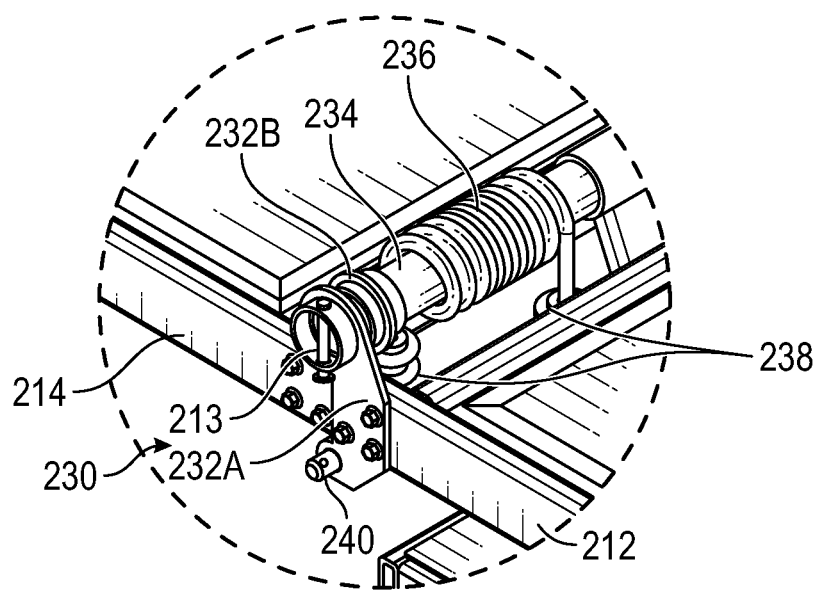
Figure 4C:
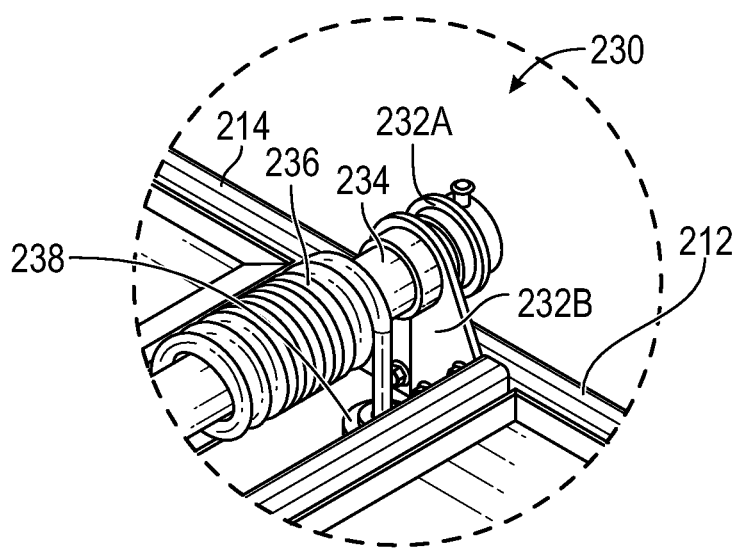
Figure 5C:
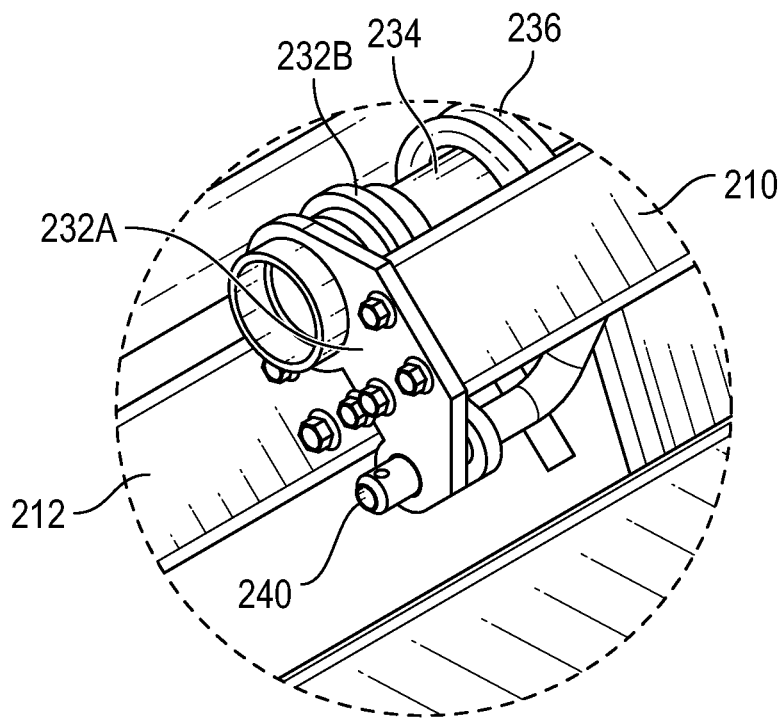
Figure 5D:
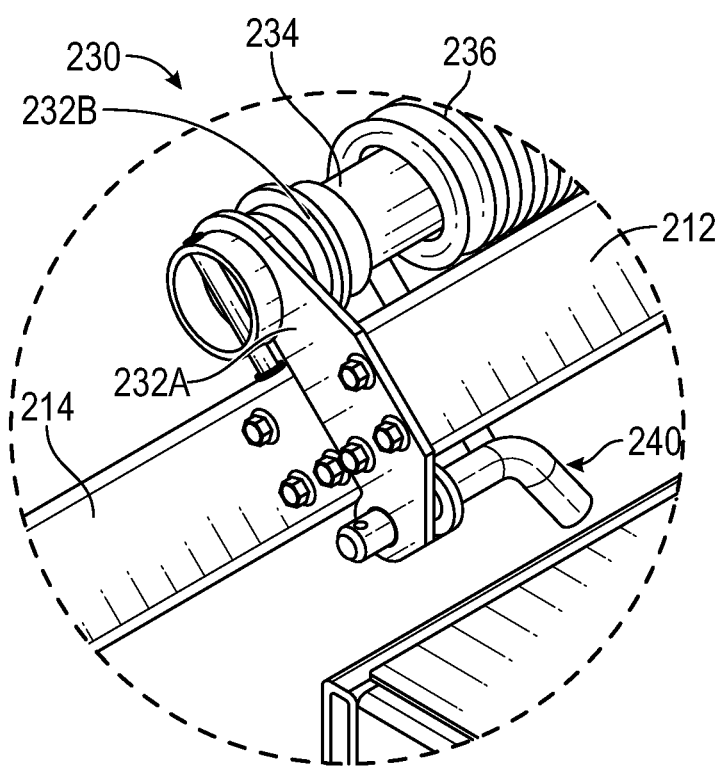

The primary hinge 230 supports the folding solar panel support frame 201. As shown in FIGS. 4A-4C, the primary hinge 230 includes a tube 234 rotatably mounted to rigid arms 334 which are oriented downward (toward the base frame 310) to connect the hinge 230 to the solar module 120 between the solar panel support frames 212, 214. The arms 334 include projections 336 extending away from the frame 330 with circular retainers 338 on the end thereof, as shown in FIG. 6E. The tube 234 extends through openings of the retainers 338. The projections 336 may have a length configured to rotate the panel frame 214 on top of the stowed panel frames 210, 212. Brackets 232 having openings 211 and 215, for respectively panel frames 210 and 214, are rotatably attached to ends of the tube 234 and fixedly attached to the frame 212, 214. The brackets 232 may be offset laterally from each other to avoid interference when the panels rotate. "Lateral" may refer to a direction parallel to the axis of rotation, which may be a central axis defined by the tube 234. For example, as shown in FIG. 5C, a first bracket 232A of the plurality of brackets 232 may be attached to the first panel frame 210, a second bracket 232B of the plurality of brackets 232 may be attached to the second panel frame 212, and the first and second brackets 232A, 232B may be laterally offset from each other in a direction parallel to an axis of rotation of the primary hinge 230. Similarly, as shown in FIGS. 4B, 4C, and 5D, a first bracket 232A of the plurality of brackets 232 may be attached to the second panel frame 212, a second bracket 232B of the plurality of brackets 232 may be attached the third panel frame 214, and the first and second brackets 232A, 232B may be offset from each other in a direction parallel to an axis of rotation of the primary hinge 230. A pin 213 may be inserted through a diameter at the ends of the tube 234 to axially restrain the tube 234 in place.

This orientation allows the solar panel frame 201 to pivot around the hinge 230 and also tilt when the system 10 is deployed. The solar panel support frame 201 holds at least one, but typically multiple, solar panels 110. The primary hinge 230 defines the axis around which the deployed solar panel support frame 201 tilts in order to place the panels at an angle to face the array at the sun based on the geographical latitude and time of year of the solar installation. In some embodiments, the tube 234 can be sized to correspond to the total length of the assembled modules.

Figure 8A:
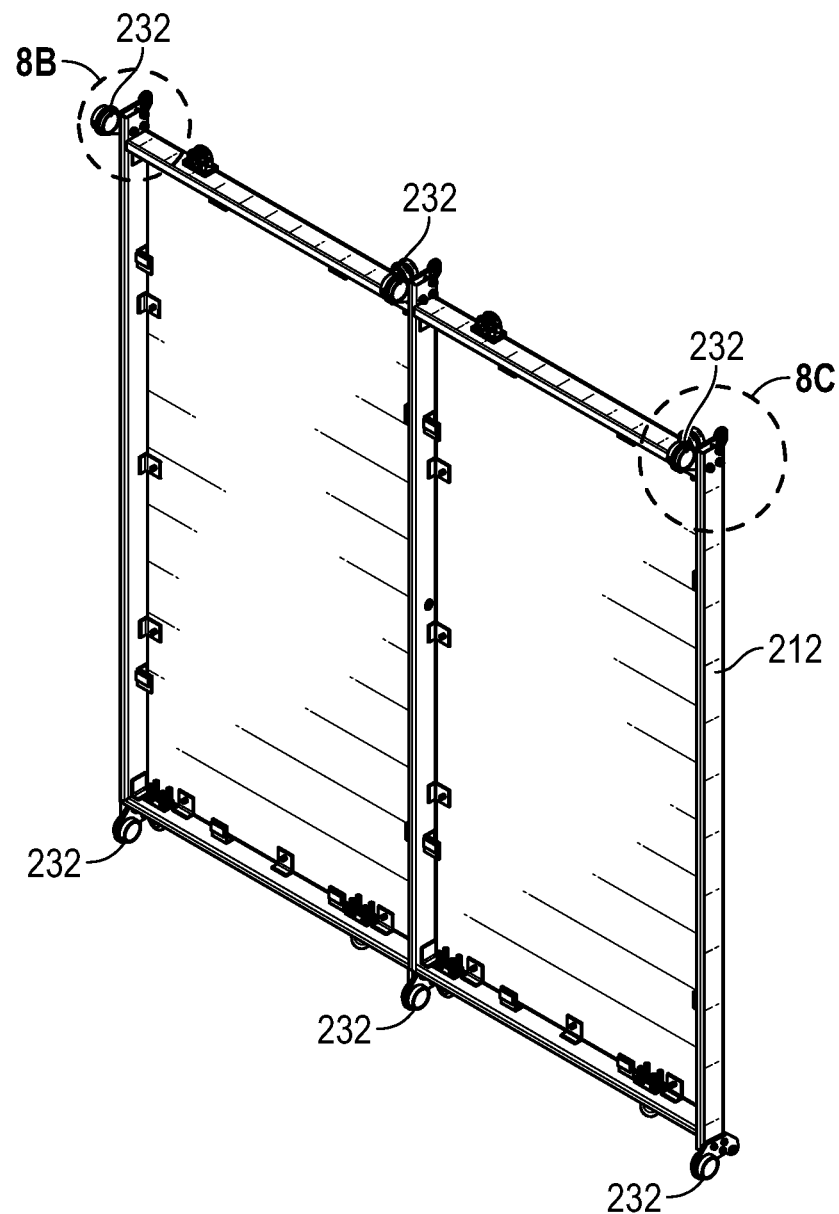
FIGS. 8A-9B are perspective and close-up views of the middle panel frame of the solar generator of FIGS. 1A-1C.
Figure 8B:
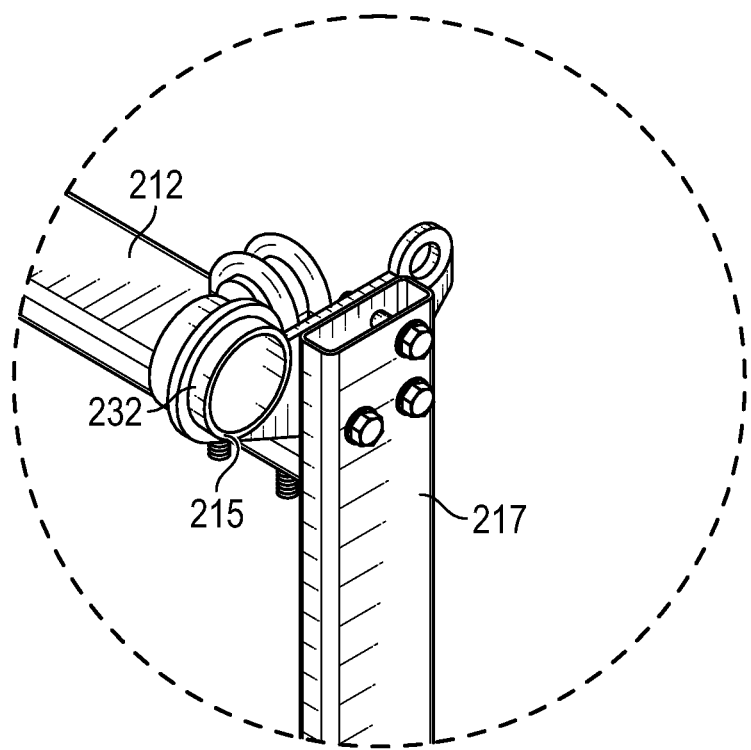
Figure 8C:
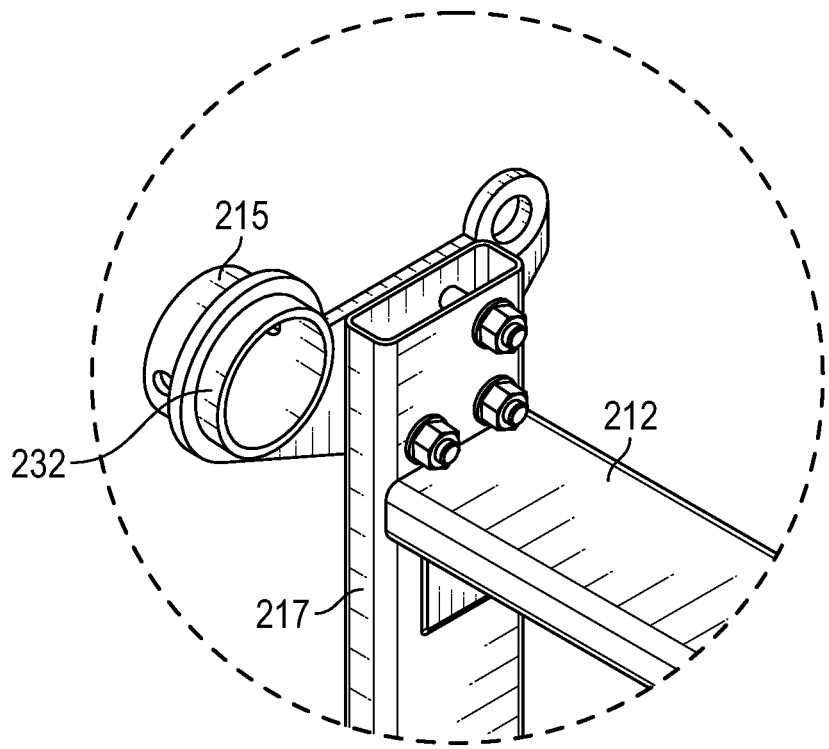
Figure 9A:
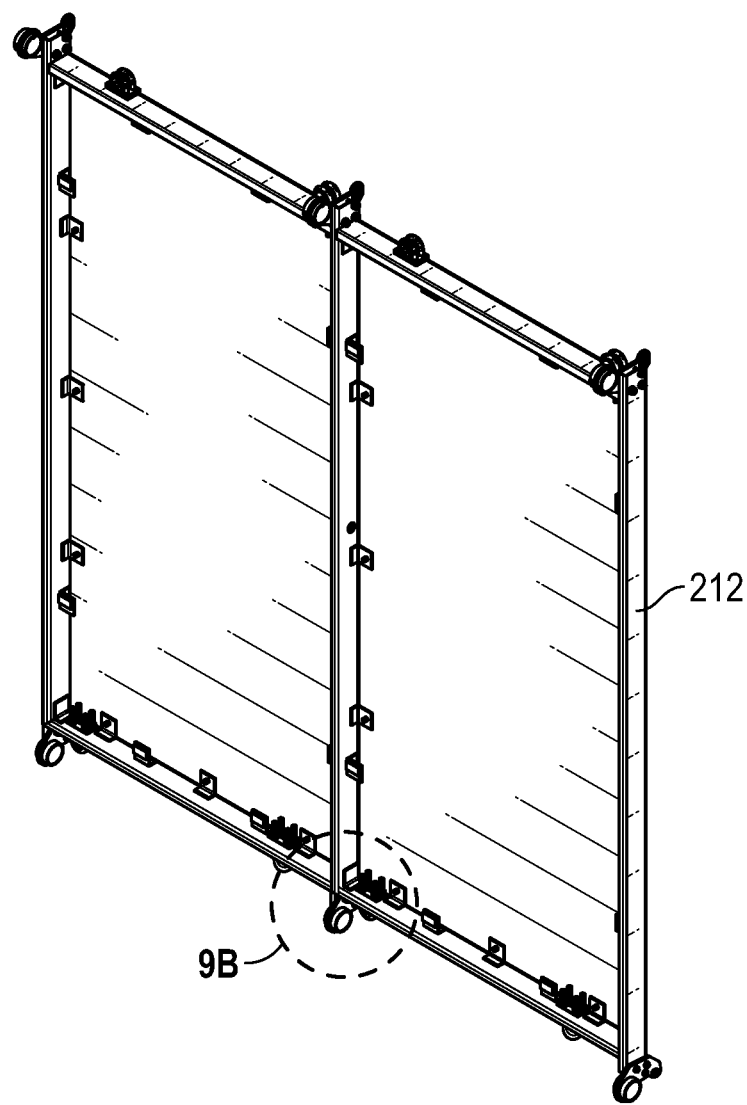
Figure 9B:
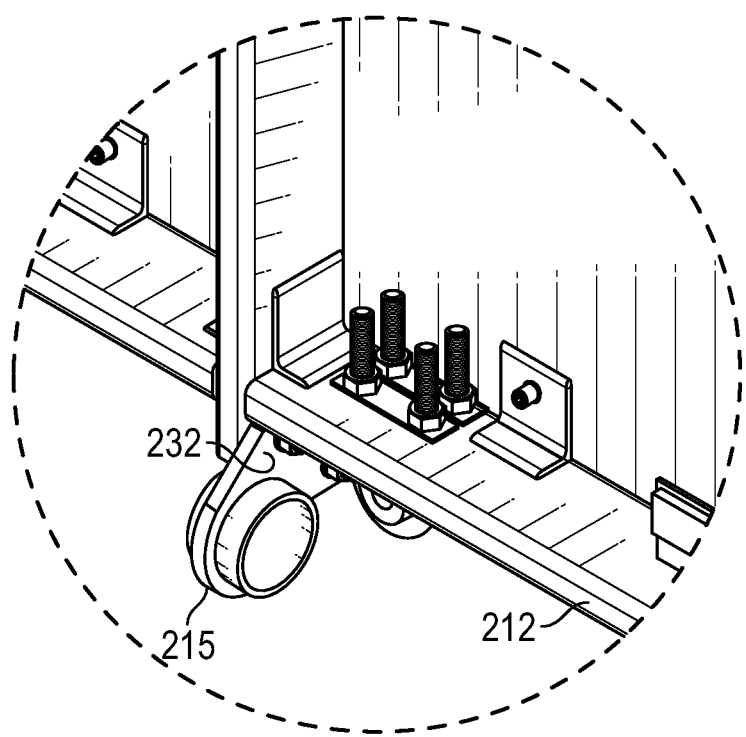
Figure 10A:
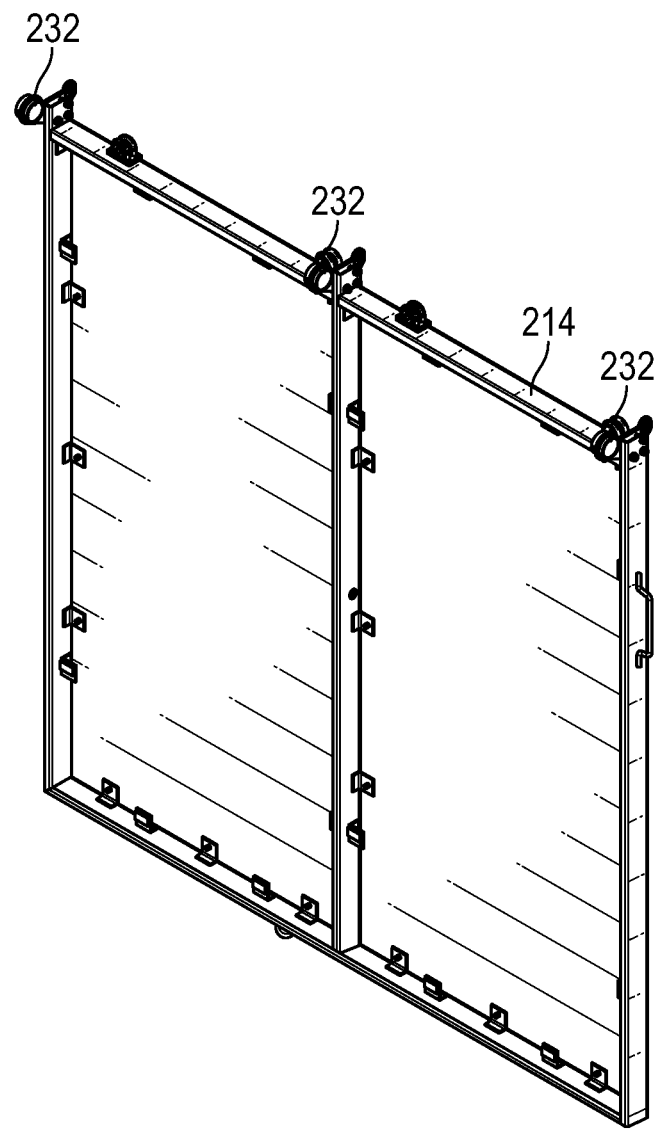
Figure 11A:
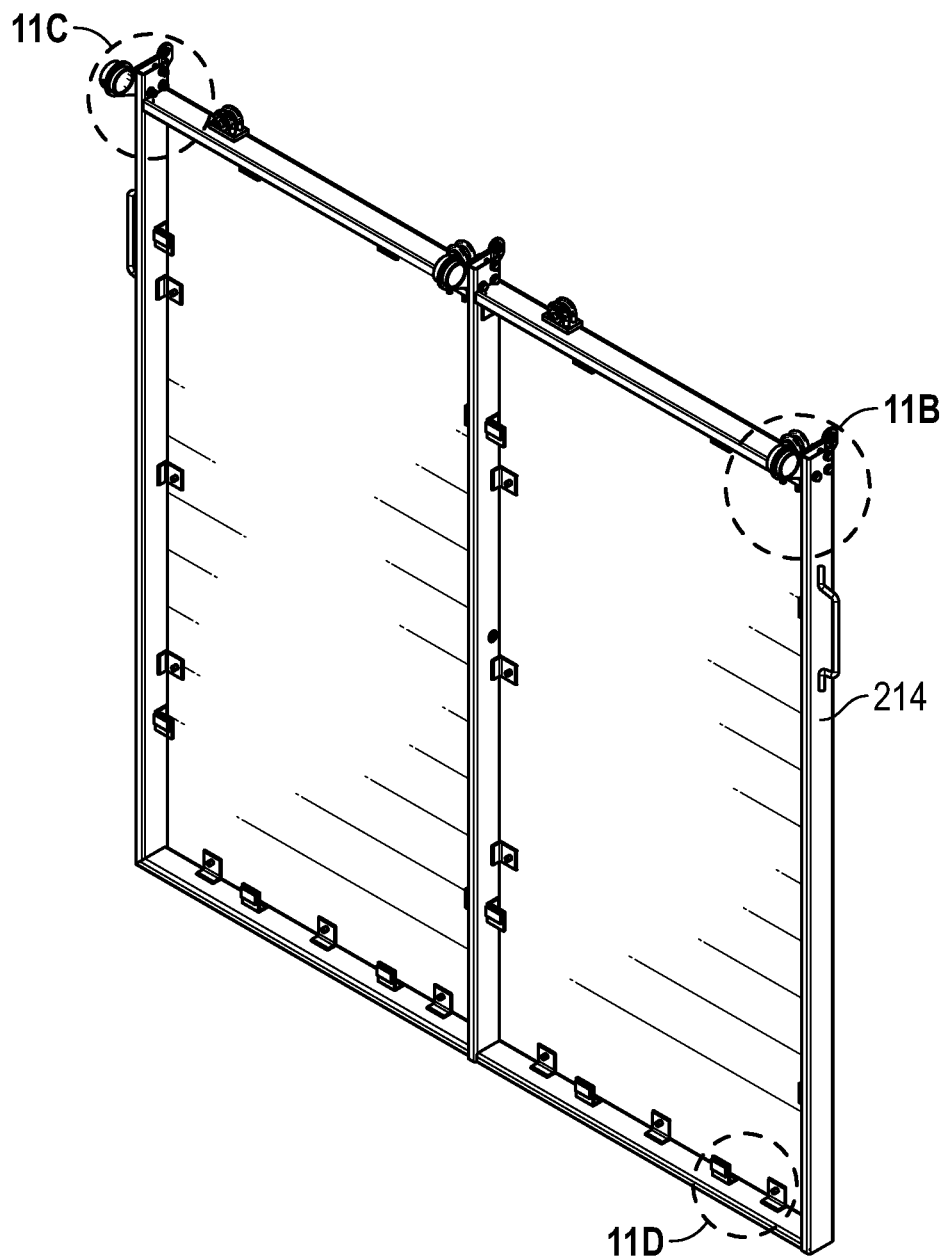
Figure 11B:
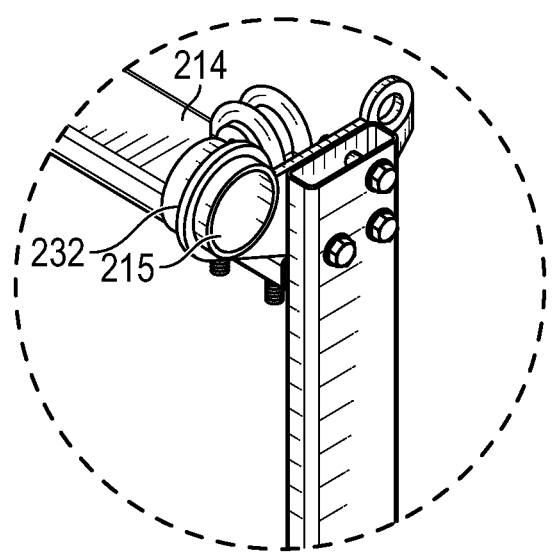
Figure 11C:
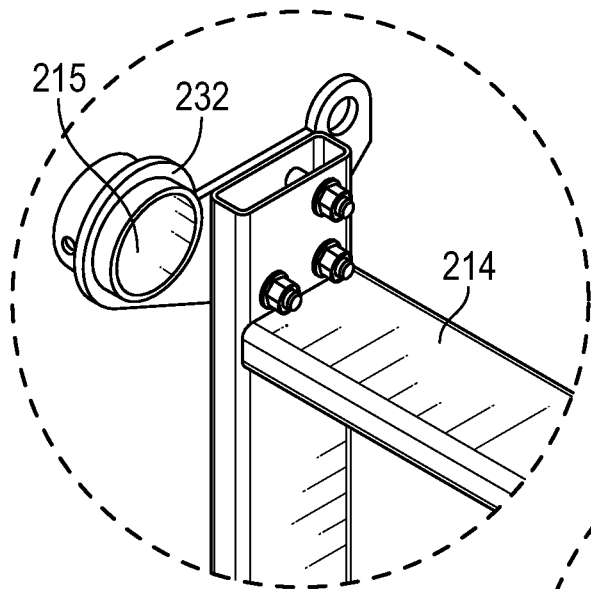
Figure 11D:
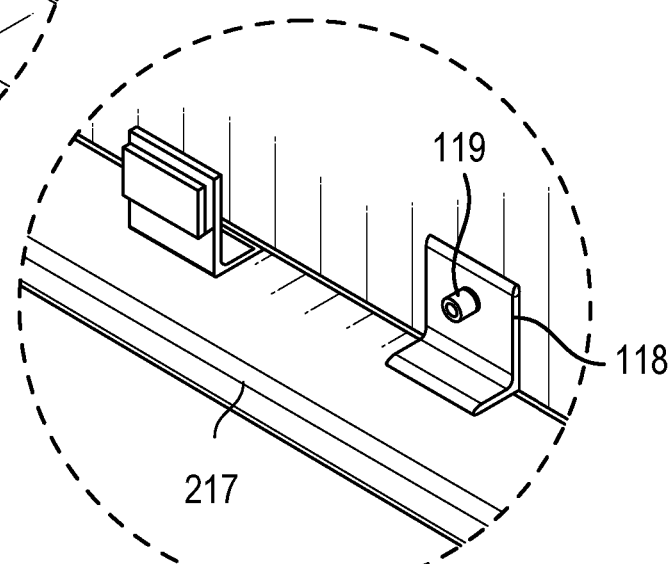
Figure 12A:
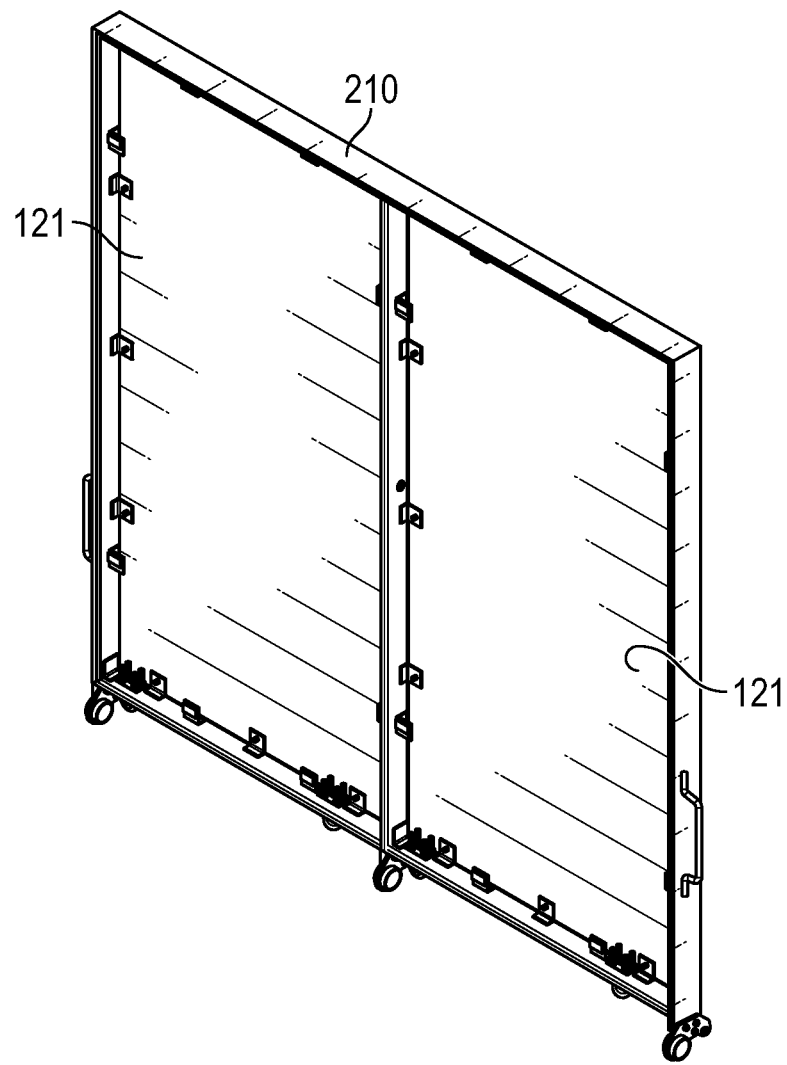
FIGS. 12A-14C are perspective and side views of the upper panel frame having a protective sheet.
Figure 12B:
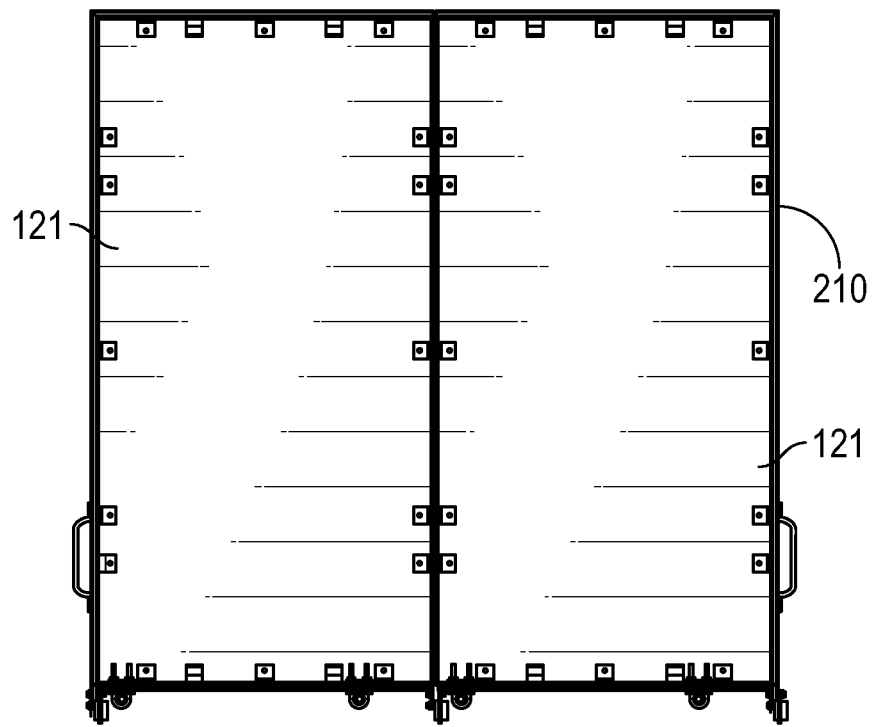
Figure 12C:
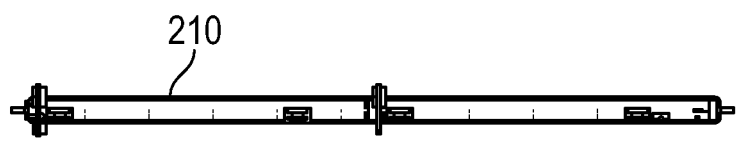
Figure 12D:
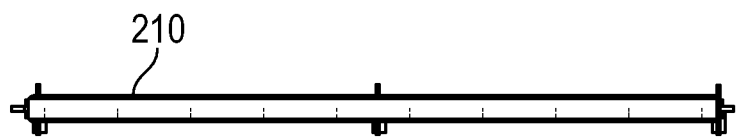
Figure 12E:
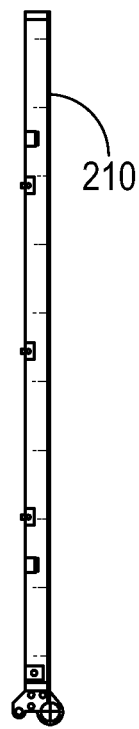

The brackets 232 may connect to edge frame members 217, as shown in FIGS. 8B and 8C. There may be four frame members 217 that form an outer perimeter of the panel frame 212. The frame members 217 may be metallic and extend along edges of the panel frame 212. The frame members 217 may support a panel, protective sheet, etc. The frame members 217 may extend beyond the edge of an adjacent frame member, as shown in FIGS. 8B and 8C. The brackets 232 may be positioned on inner (FIG. 8B) and outer (FIG. 8C) sides of the frame member 217. The panel frames 210, 214 may include the frame members 217 and brackets 232 as described, as well. Adjacent panel frames, for example panel frames 210 and 212, or panel frames 212 and 214, may have opposing brackets 232 laterally offset to accommodate rotation of each bracket relative to each other. For example, the bracket 232 on the upper end of the frame member 217 of the panel frame 212 may be located on the outer side of the frame member 217, while the opposing bracket 232 on the lower end of the frame member 217 of the panel frame 214 may be located on the inner side of the frame member 217 of the panel frame 214, etc.

Figure 7A:
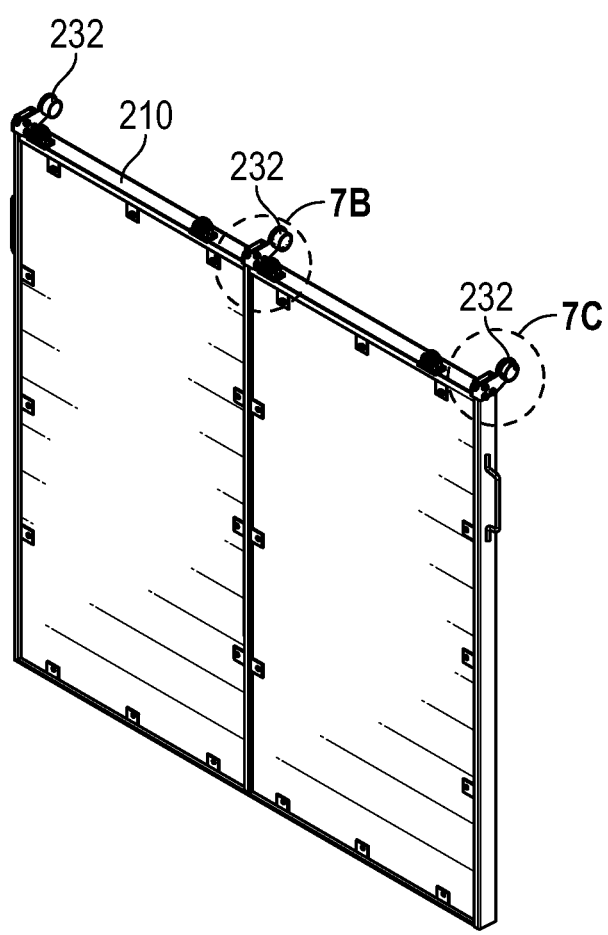
FIGS. 7A-7C are perspective and close-up views of the upper panel frame of the solar generator of FIGS. 1A-1C.
Figure 7B:
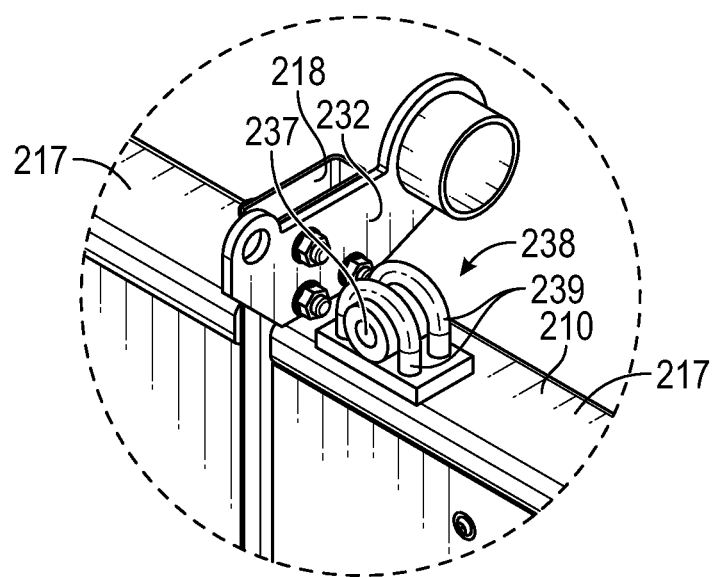
Figure 7C:
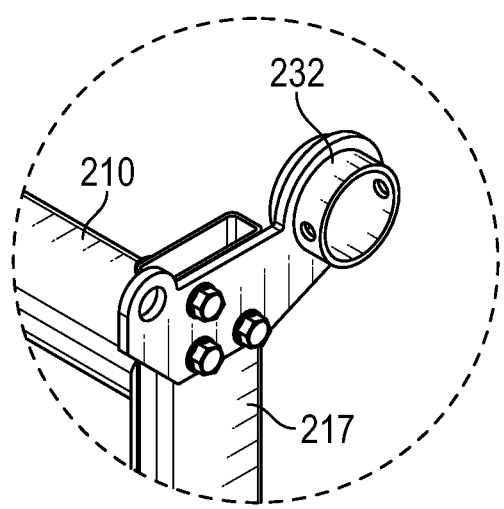

The panel frames may include central frame members 218, for example as shown in FIG. 7B with respect to panel frame 214. The frame member 218 may extend between edge frame members 217 along the length of the panel frame 214. The frame member 218 may have similar features as the frame member 217 except for its location. The frame member 218 may extend beyond the ends of adjacent frame members 217, as shown in FIG. 7B. The protruding end of the frame member 218 may attach to the bracket 232, which may be laterally offset from a bracket 232 on the opposing panel frame 212. Similar arrangements of the central end edge frame members may be included for the panel frames 210 and 212.

The one or more modules 120, 122, 124 may connect together to form a base of a desired size. This allows for customizing the amount of solar energy collected and corresponding amount of electrical power produced for a given application. The tube 234 may extend continuously through each primary hinge 230 of the plurality of solar modules. As shown, for example in FIG. 2B, a single, long tube 234 extends through the primary hinges of the solar modules 120, 122, 124. Similarly, an additional tube 234 extends through the secondary hinges of the solar modules 120, 122, 124. Each solar module 120, 122, 124 may have a larger-diameter tube into and through which the tube 234 extends.

In some embodiments, there may be separate tubes 234 for each solar module. For example, the ends of the tubes 234 in the primary and secondary hinges 230, 220 may connect to adjacent end brackets 232, such as the bracket 232A shown in FIGS. 4B and 4C. The pin 213 may secure adjacent tubes 234 together. The end of one of the tubes 234 may have a relatively larger width and receive therein the other tube 234 having a relatively smaller width, with the pin 213 rotatably securing the tubes 234 together. In some embodiments, a fitting may connect the ends off the tubes 234 together.

The individual solar modules 120, 122, 124 may be deployed and stowed independently of each other. For example, the base frames 310 may be connected together, but the panel frames of a first base frame 310 may not be connected to the panel frames of an adjacent base frame 310. Thus the solar panels on each base frame 310 may be deployed and stowed independently of each other.

In some embodiments, adjacent panel frames may stow and deploy together. The panel frames may be connected along the length of the frame edges that are adjacent each other. For example, opposing edges of adjacent panel frames 210, 210 at the upper part of the array (e.g. shown in FIG. 1A), may attach together at one or more locations along the opposing edges. In some embodiments, the upper most opposing edges of edges of the frames 210 may connect together and lower most opposing edges of the frames 214 may connect together. The edges may connect similarly to the tubes 234 that connect at the hinges 220, 230, as described. Brackets, fittings, or other suitable mechanical attachments may be used as well.

In some embodiments, the hinges 220, 230 may support the respective panel frames 210, 212, 214 in a planar orientation for a given solar module. For example, the module 120 may include supports at the hinges 220, 230 to support the panel frames 210, 212, 214 of that module 120 in a planar orientation. There may be hard stops preventing rotation of the panel frames 210, 212, 214 beyond a planar configuration. The modules 122, 124 may have similar features. The hinges 220, 230 may support the weight of the deployed panel frames such that attachments of the panel frames to each other may not be necessary except at the hinges 220, 230, as described.

Figure 6A:
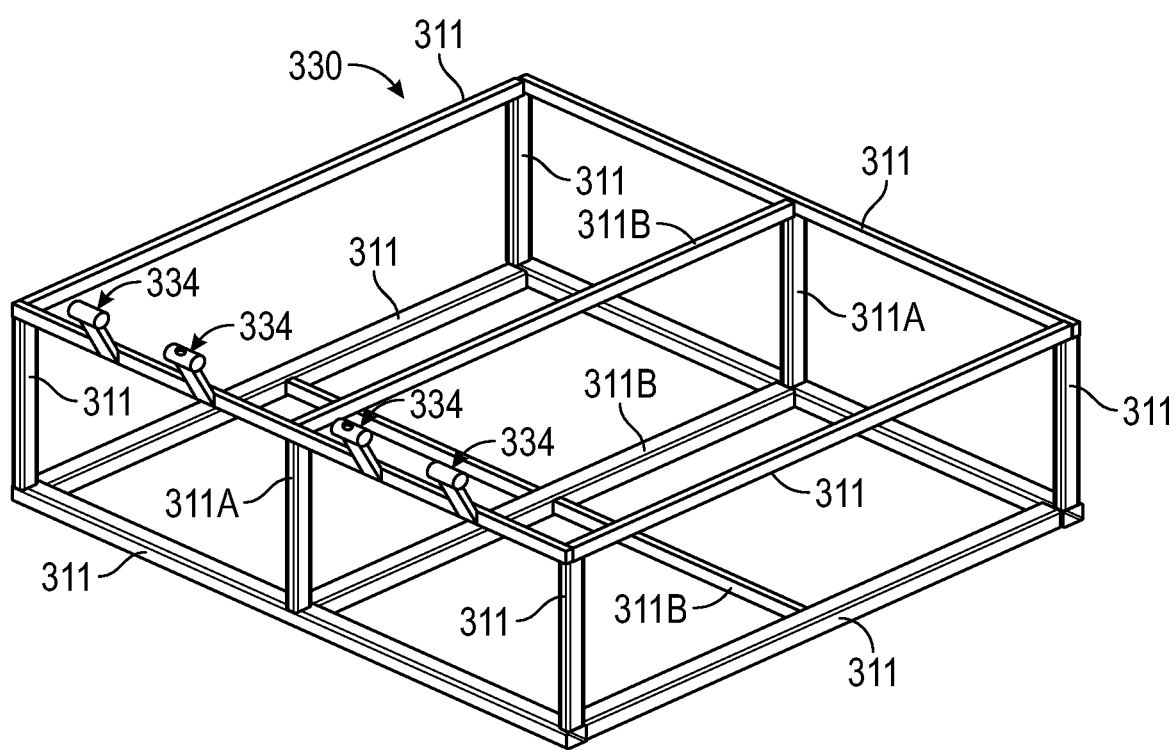
Figure 6B:
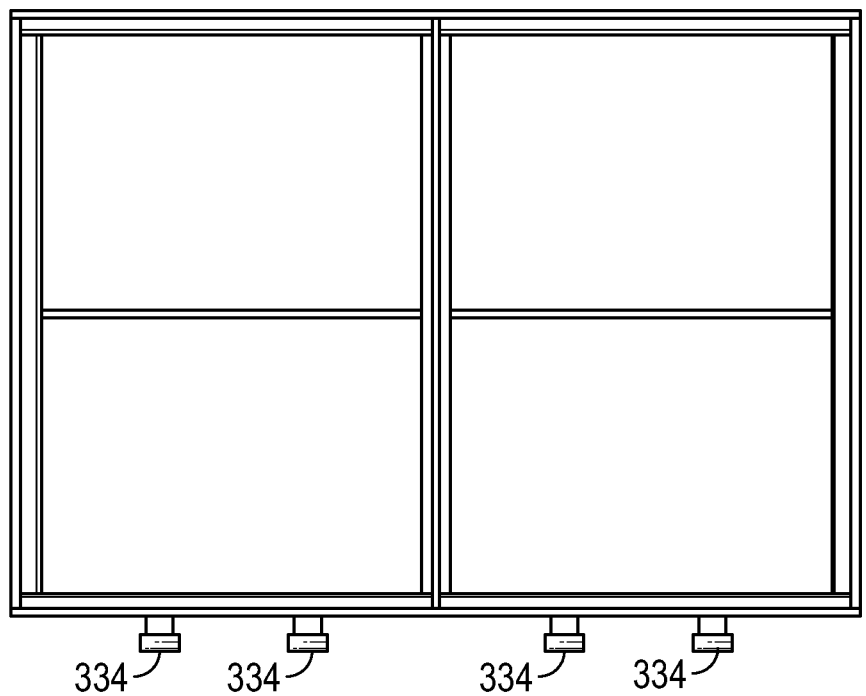
Figure 6C:
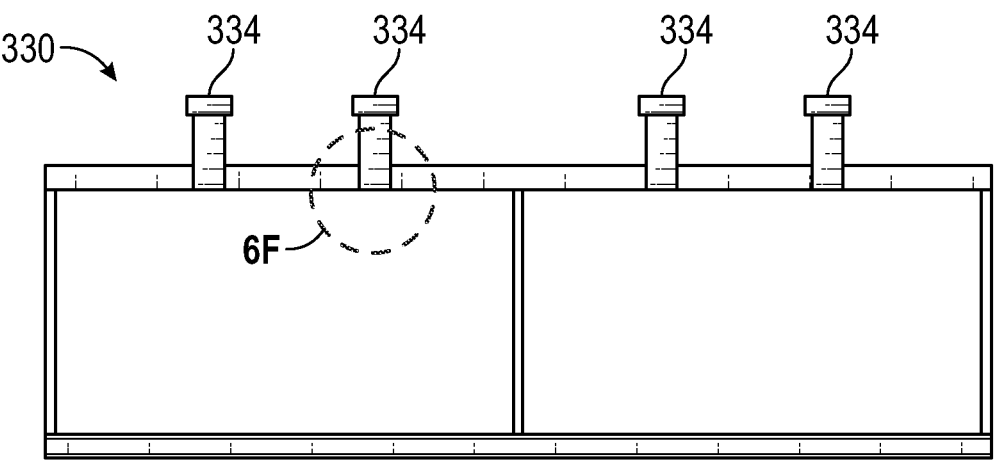

The base frames 310 may attach to each other to form the base 300. As shown in FIG. 1C, each base frame 310 may include frame members 311 and sidewalls 312. The frame members 311 may frame the base frame 310 and support the sidewalls 312. There may be multiple edge frame members 311 along the edges of the base frame 310. There may be one or more central vertical frame members 311 supporting the sidewalls 312 between the edges. The sidewalls 312 may be located on the top, bottom, and/or sides of the base frame 310. Some of the sidewall 312 are removed in the figures for clarity. The sidewalls 312 may completely enclose the base frame 310 to prevent access therein. In some embodiments, adjacent sidewalls 312 of adjacent base frames 310 may be removed to create a continuous inner volume of the base 300. The base frame 310 may also include central longitudinal frame members, as shown in FIG. 6A.

The base frames 310 may be welded or bolted together. The frame members 311 may be welded or bolted together. The base frames 310 may share frame members 311 to rigidly affix the modules 120, 122, 124 together. A single frame member 311 may extend across two or more base frames 310. The panel frames may be connected at their rotational axis by way of the tube 234 which extends through all of upper or lower panel frame brackets 232. The panel frames may be connected with the tube 234 extending inside an axis tube of each module. The upper and lower panel frames may only be connected at the hinges 230, 220. Each of the three modules may open and close independently.

In some embodiments, the base frames 310 may be connected together by the tubes 234 extending between the respective hinges 220, 230. The base frames 310 may be supported by the mobile platform and only connected by the tubes 234.

The primary and secondary hinges 230, 220 include torsion springs 236. There are four springs 236 per hinge, as shown. There may be one, two, three, five or more springs 236 per hinge. The springs 236 are used to offset the weight of the solar panel support frame 201 to provide assistance in opening and closing. The torsion springs 236 are affixed to panel frames 210, 212, 214 that are adjoined by way of the hinges 220, 230. A capture device 238 connects to ends of the torsion spring 236. The capture device 238 projects outward from opposing outside surfaces of opposing panel frames. As shown in FIG. 7B, the capture device 238 includes a central catch 237 surrounded by two retainers 239. The catch 237 receives therein and fixedly attaches to an end of the spring 236. There are two capture devices 238 for each spring 236. The capture device 238 may connect to edge frame members 217 of the panel frame 214. There may be three capture devices 238 along an edge of the panel frame 214. The panel frames 210, 212 may include similar arrangements of the capture devices 238 thereon. The torsion springs 236 installed between the panel frames 210, 212, 214 provide rotational biasing forces which counteracts the weight of gravity of the solar panels 110 and support frame 201. This makes the system 10 easier and faster to deploy and stow. The torsion springs 236 can be arranged to store energy. The torsion springs 236 can be arranged to release energy as the panels are rotated. The force exerted by the torsion springs 236 can tend to lift the panels frames 210, 212, 214. The torsion springs 236 can bias two adjacent panel frames into a deployed configuration.

Figure 2A:
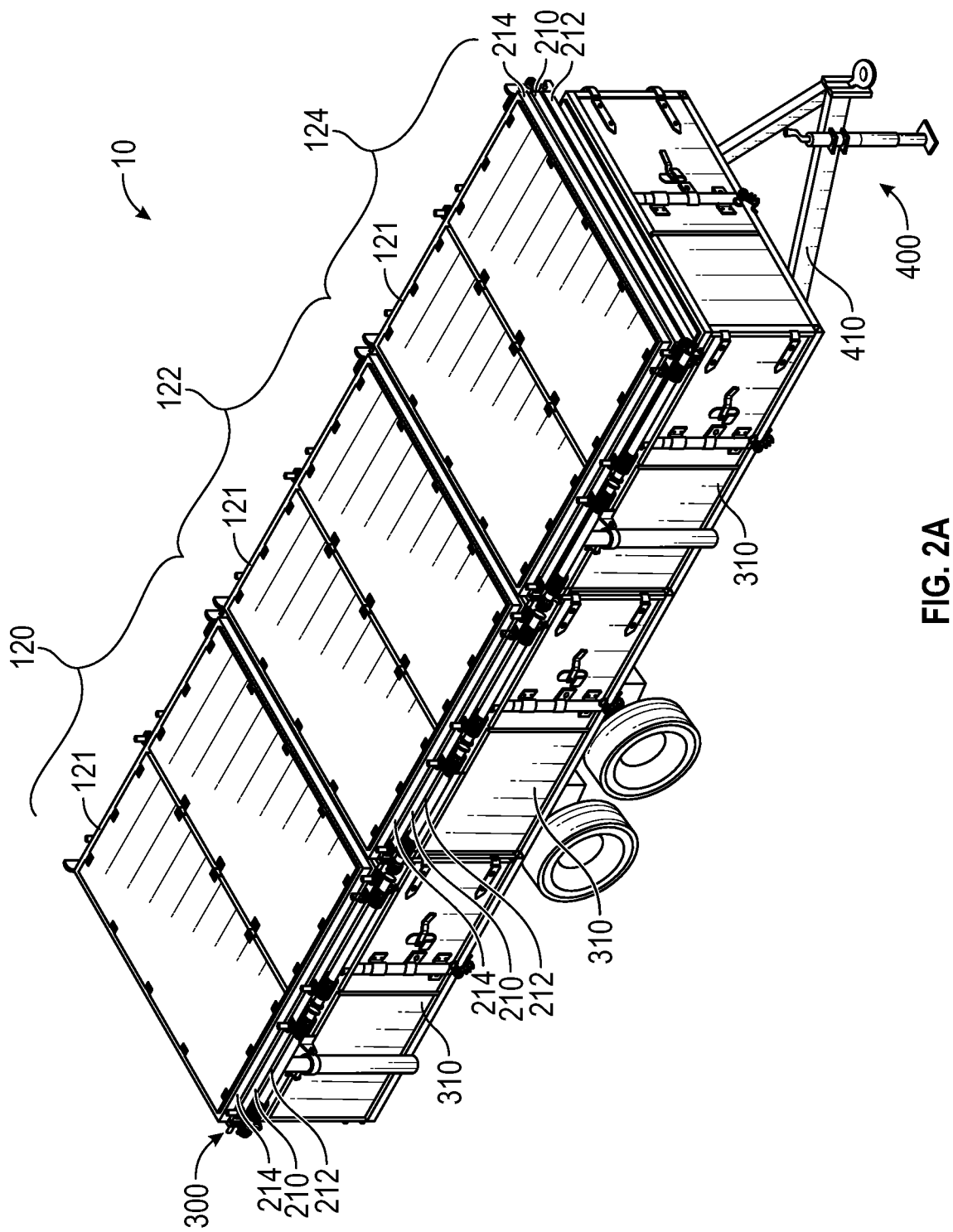
FIGS. 2A-2D are various views of the mobile solar generator of FIGS. 1A-1C in a stowed configuration.
Figure 2B:
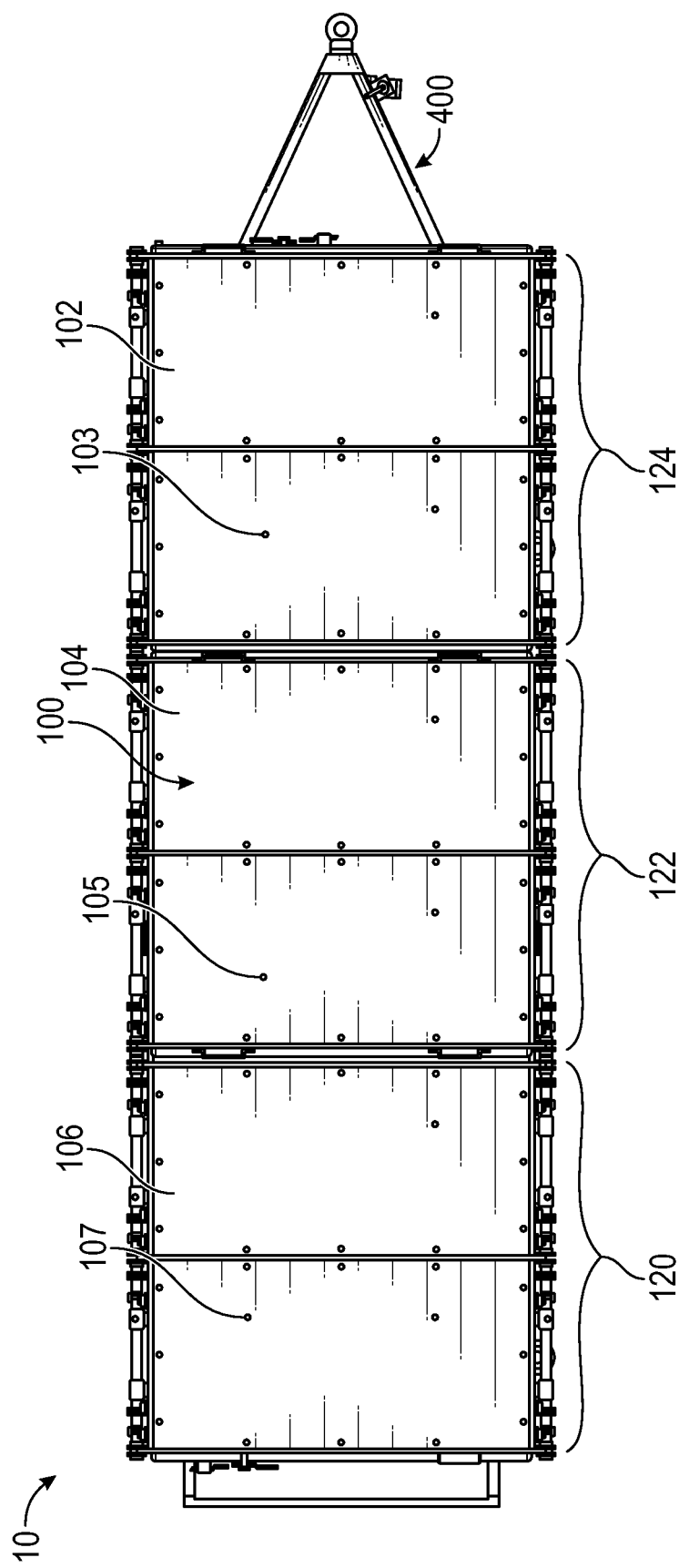
Figure 2C:
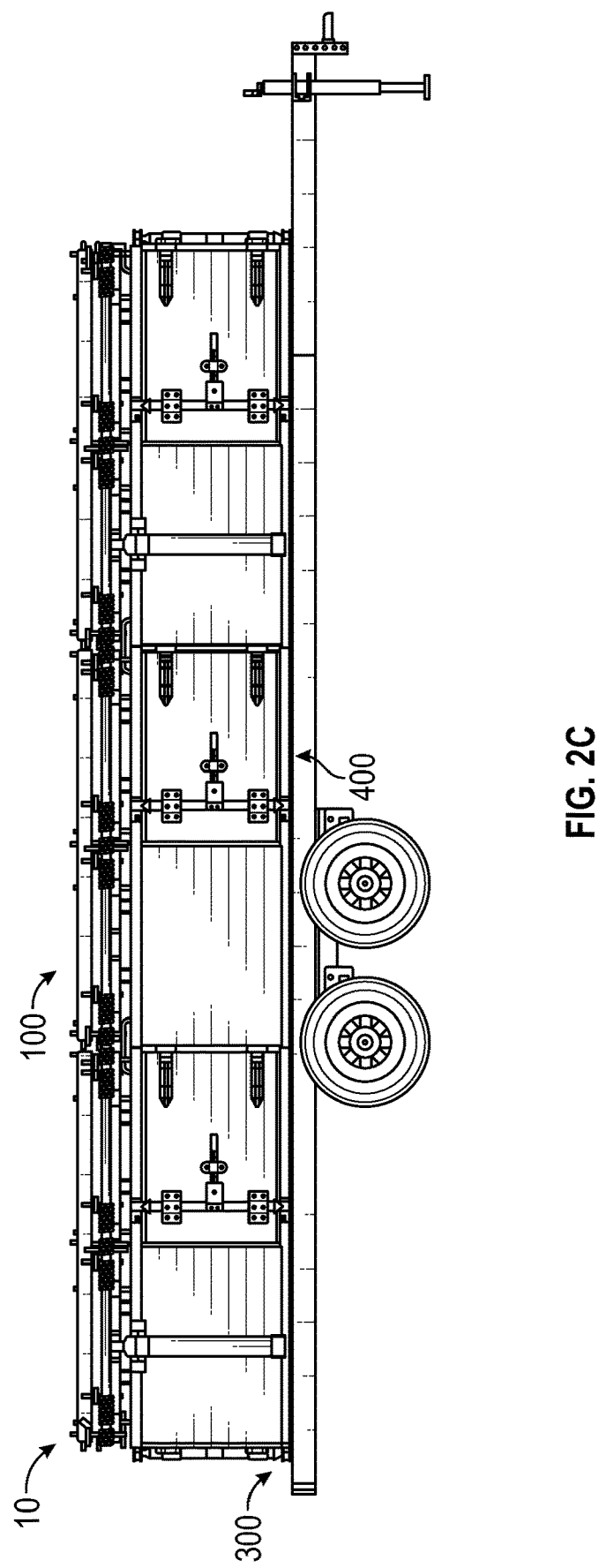
Figure 2D:
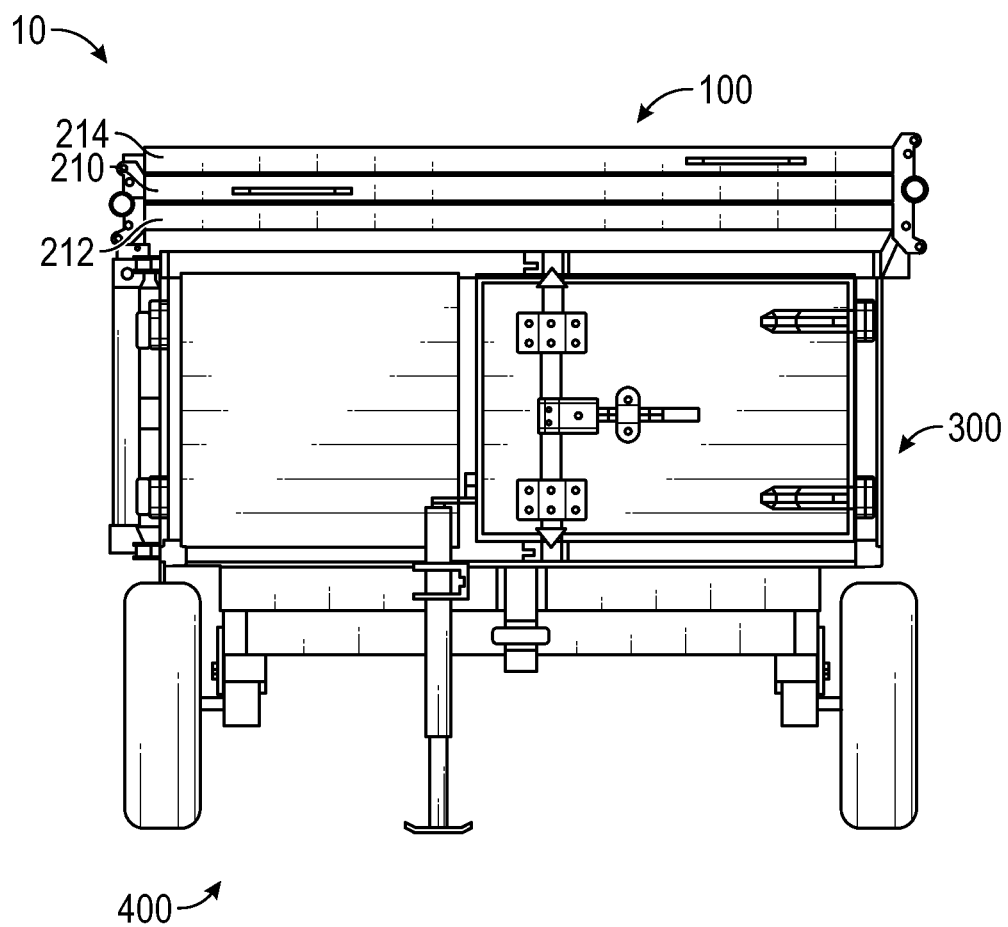
Figure 3A:
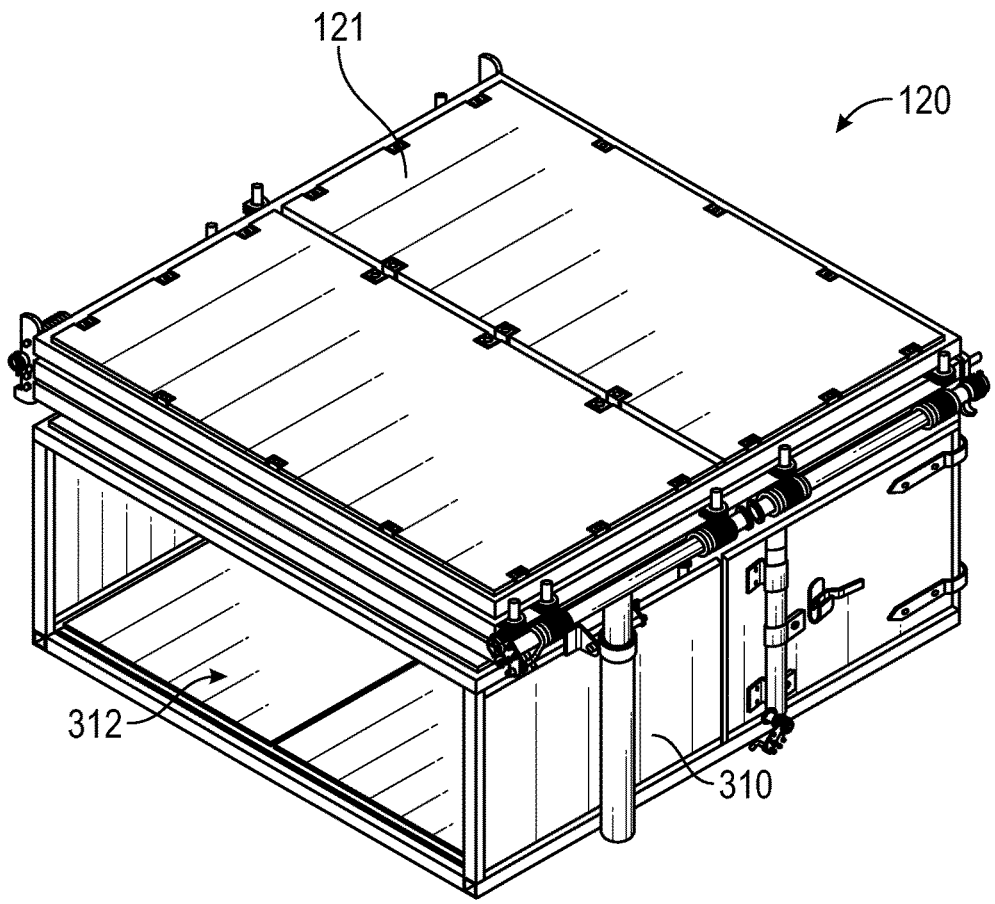
FIGS. 3A-3F are various views of a solar module used in the mobile solar generator of FIGS. 1A-2D and shown in a stowed configuration.
Figure 3B:
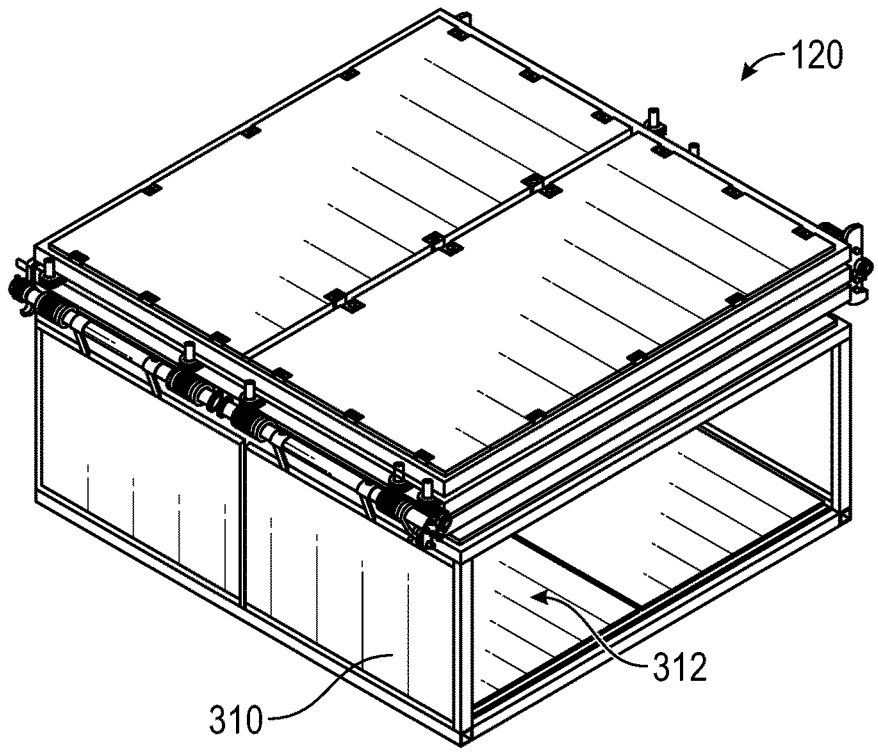
Figure 3C:
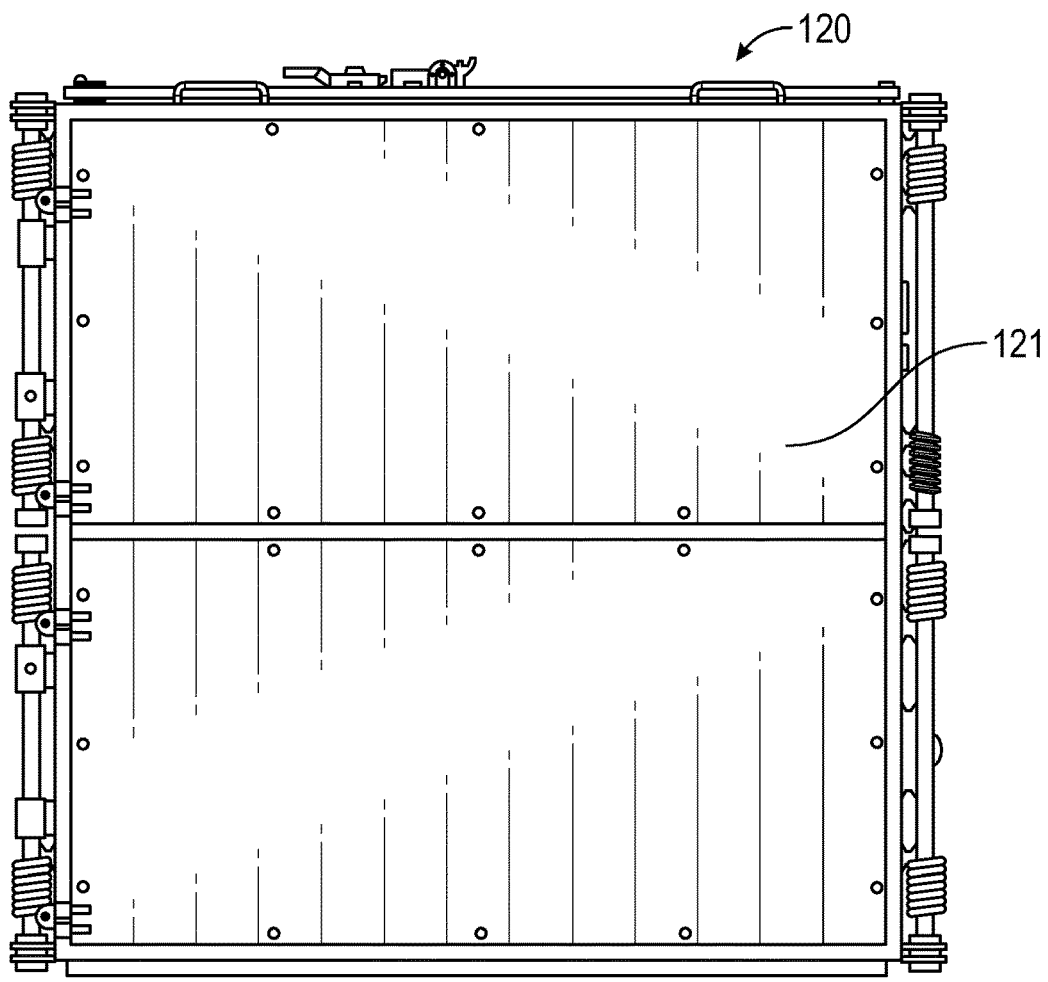
Figure 3D:
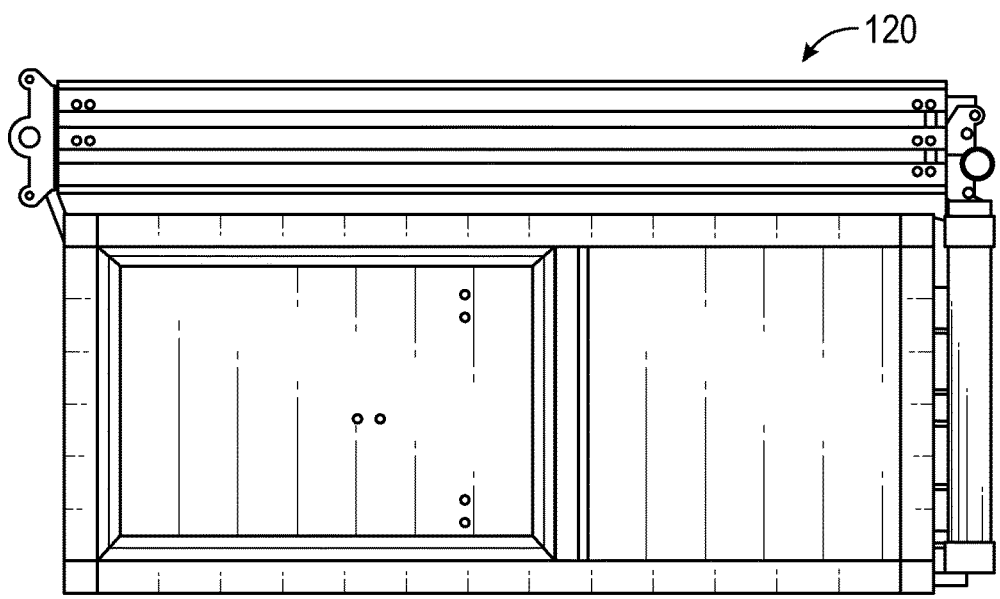
Figure 3E:
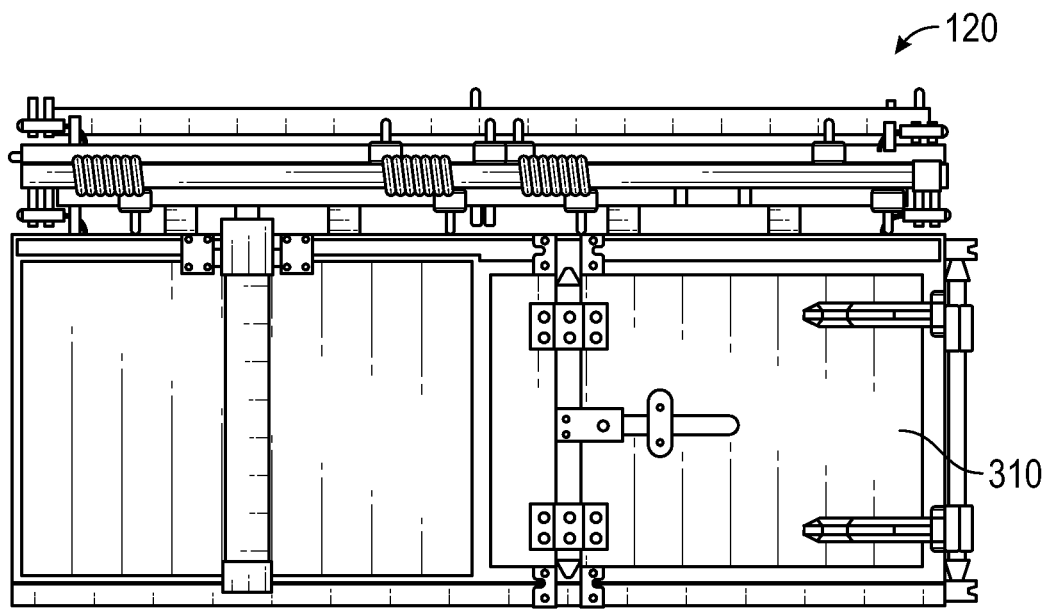
Figure 3F:
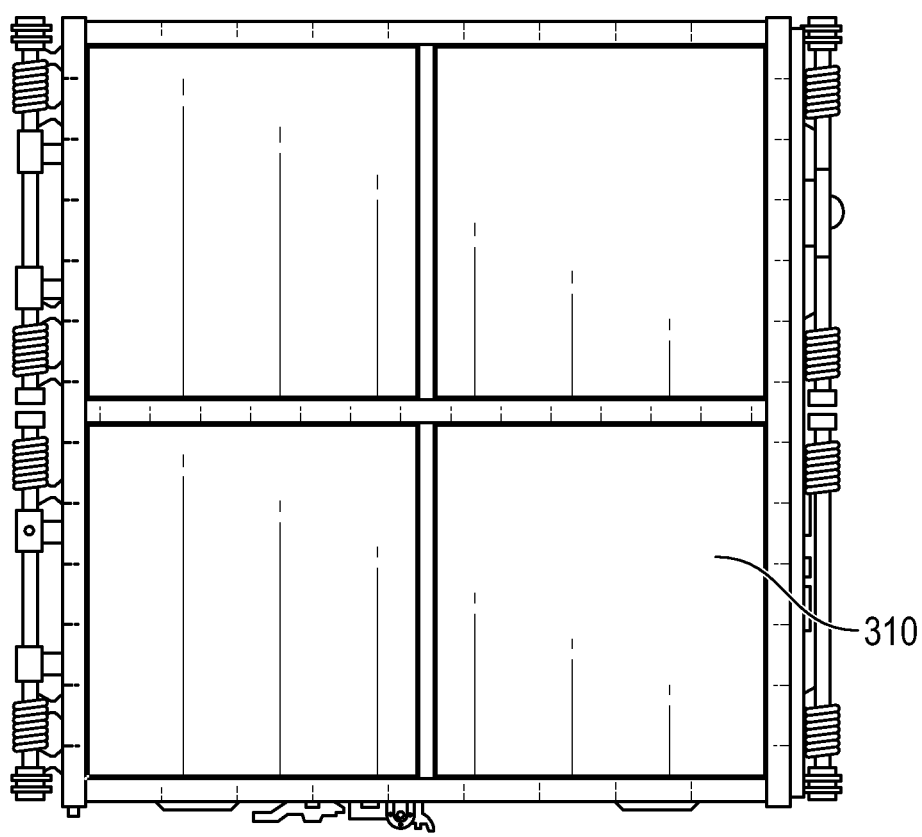

All solar panel wiring is protected from external vandalism by routing it through the panel frames 201 and/or metal conduit. When the panel frames 210, 212, 214 are opened to the deployed position (solar panels all facing outward), they are locked into place by a locking mechanism 240 (shown in FIGS. 4A-5D) to avoid inadvertent closing or excessive vibration from weather. The locking mechanism 240 includes a pin that extends through an opening in the bracket 232 to prevent relative rotation between adjacent panel frames. The pin can extend through two or more openings, each opening fixed to a different panel frame. When the panel frames 210, 212, 214 are folded into the stowed position (solar panels not exposed outward) they are locked into place by mechanical means to prevent tampering, theft, and vandalism. As shown in FIG. 2C, the panel frames may be locked in the stowed position using aligned lugs having openings therethrough. A first lug may extend from a first panel frame and a second lug may extend from a second panel frame, with openings in the lugs aligning and configured to receive a pin therethrough to lock the panel frames together. A padlock or other lock may secure to the pin to prevent removal of the pin.

The power electronics are secured inside the enclosed base 300 by way of locking doors 313. (For clarity, some of the doors 313 and walls 312 of the base 300 are removed in FIG. 1B.) The power electronics may include: solar charge controller(s) 350, batteries 360, and/or other components such as inverter(s), supporting wiring and electronics, etc. The enclosed base 300 can be formed from one, two or more base frames 310. The base frames 310 can have locking door 313 on one or more exterior sides. The number and location of locking doors 313 on the base frame 310 can vary between various modules. For example, a central module, such as module 104 may have a single locking door 313. The locking door 313 can be positioned on either side of the module 104. The module 104 can have multiple locking doors. The outer modules 102 and 106 can have locking doors 313 on one, two or three sides. The outer modules 102 and 106 can have one or more locking doors 313.

Each of the modules 102, 104, and 106 can have one or more open sections. The open sections can be positioned adjacent when the enclosed base 300 is assembled. The assembled solar modules can form a partly (e.g., completely) closed volume. This volume can be accessible through the locking doors 313. The locking doors 313 can be positioned around the perimeter of the closed volume.

The number of modules used can be varied during assembly. The inner modules can have a first configuration. For example the inner modules may have one locking door 313. The outer modules can have a second configuration. For example, the outer modules could have one or more (e.g., two) locking doors 313 and an actuator 250.

Each solar module, such as the depicted solar modules 102, 104, and 106 is configured to connect with one or more other solar modules. Assembling the modules can include welding, riveting, mechanical fasteners and other means of fastening. The base frames 310 of the solar modules can be affixed to the adjacent base frame(s) 310 of other modules. Solar panel support frames 201 can be affixed to adjacent panels.

As shown in FIG. 6A, the base frame 310 may include central longitudinal frame members 311B. The base frame 310 may be framed by the members 311, 311A, and 311B. The members 311, 311A, and 311B may be welded together or attached together using fittings or other attachments. The base frame 310 is shown without any sidewalls 312 for clarity. Adjacent members 311 of adjacent base frames 310 may connect together to form the base 300. Various fittings, brackets, or other suitable mechanical attachments may be used to connect adjacent base frames 310. The members 311A and/or 311B of adjacent base frames 310 may also attach to each other.

Figure 14A:
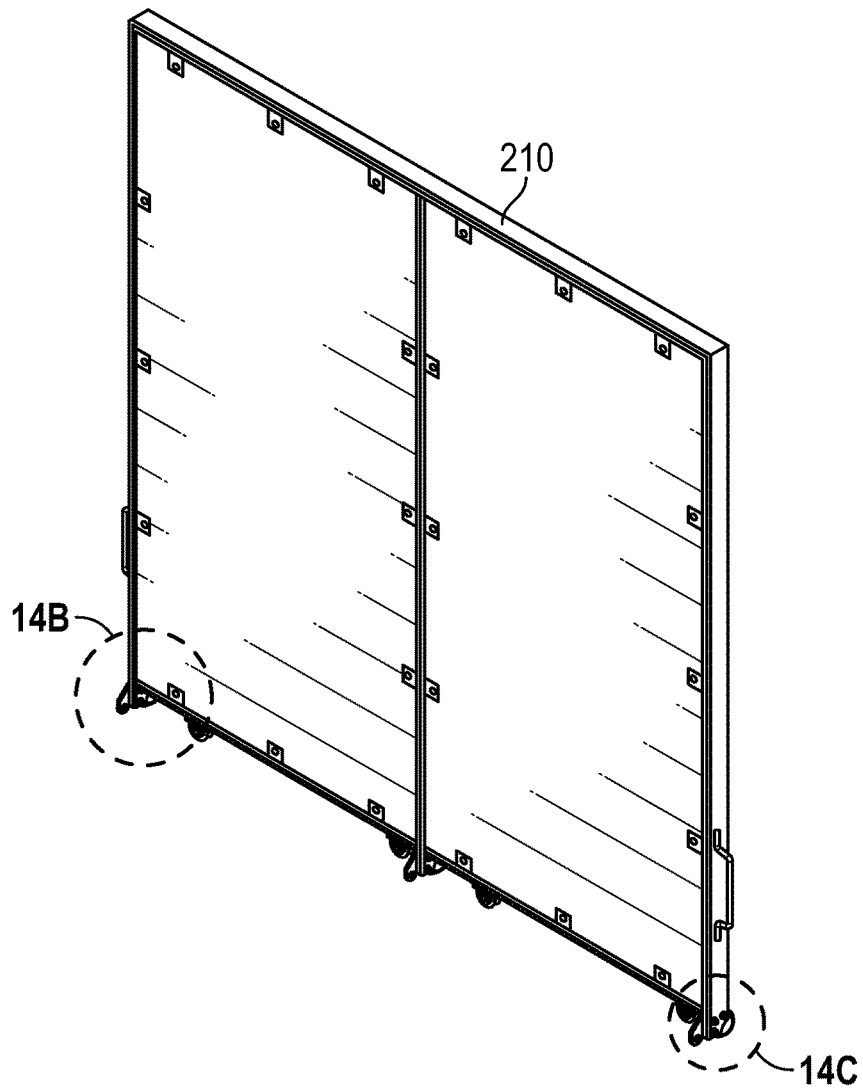
Figure 14B:
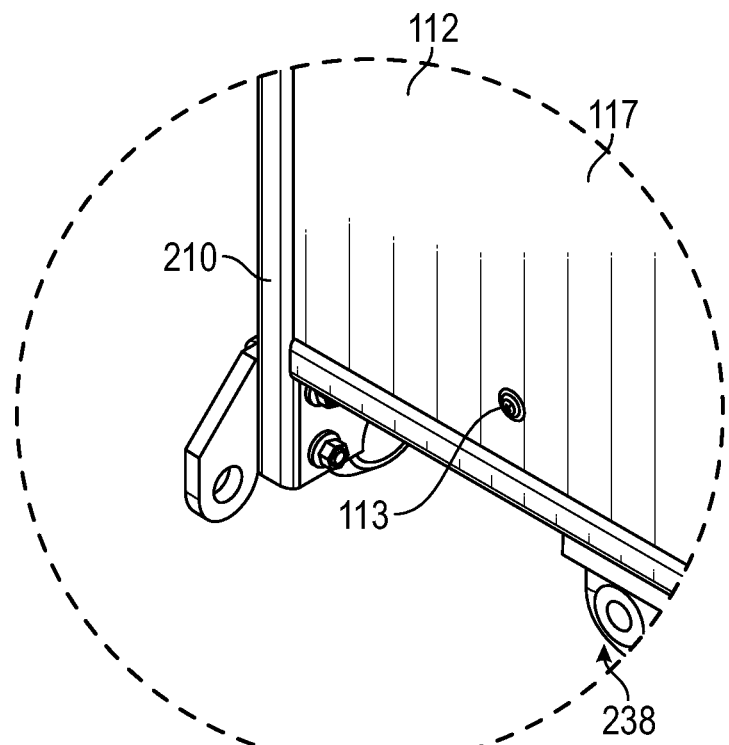
Figure 14C:
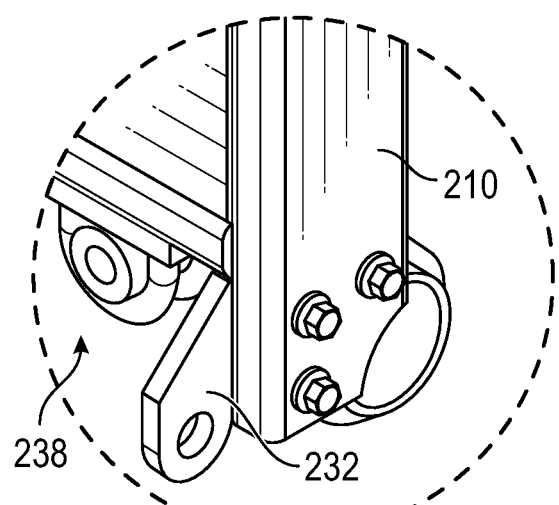

A protective sheet 117 of material (metal in this embodiment) is affixed to the rear 121 of the solar panel support frame 201 by way of tamper-resistant hardware 113, shown in FIG. 14B. This protective sheet 117 is installed to protect the back side of the solar panels 110. The purpose of this sheet 117 is to make access to the solar panel wiring and solar panel mounting hardware difficult. This will reduce risk of theft and vandalism of the panels and wiring. The sheet 117 may be installed using numerous tamper-resistant hardware 113 as shown in FIG. 14A. The hardware 113 may include non-standard screws or bolts in an attempt to deter access. The hardware 113 may be bolts with 5-sided heads, or a standard Torx screw head made in a tamper-resistant form with a pin in the center. The sheet 117 can be supported by the solar panel support frame 201, such as by the edge and central panel frame members. Electrical wiring, for example wiring connecting the solar panel 110 to a charge controller and routed between the protective sheets 117 and the respective panel frames 201, can prevent access to the wiring. The power inverter, or inverter, may be a power electronic device or circuitry that changes direct current (DC) to alternating current (AC). The inverter may be used to convert battery power into alternating current. A charge controller may be included having instructions stored on a non-transitory computer readable medium that, when executed by a processor, controls the solar power collection process such as charging of the batteries.

Figure 13A:
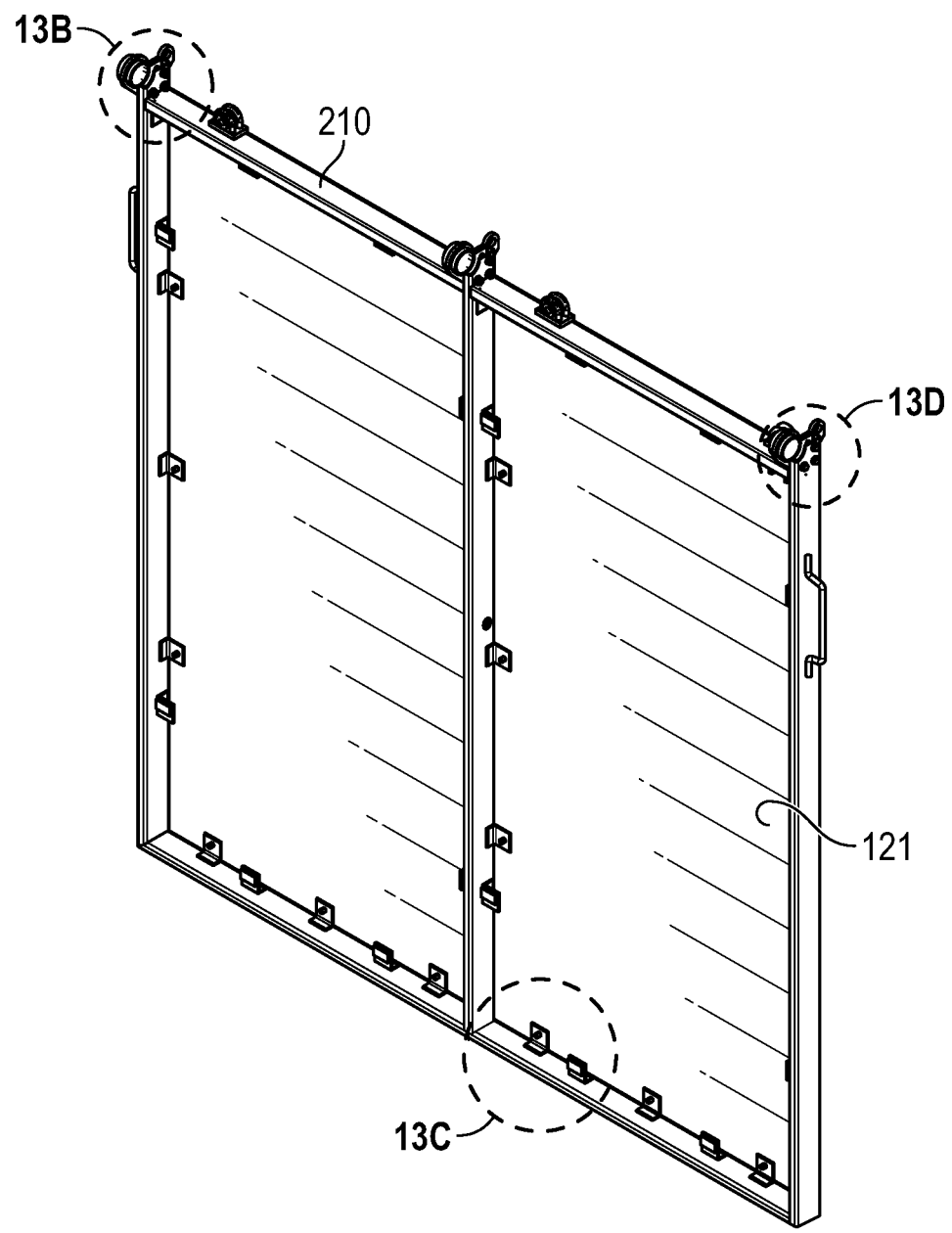
Figure 13B:
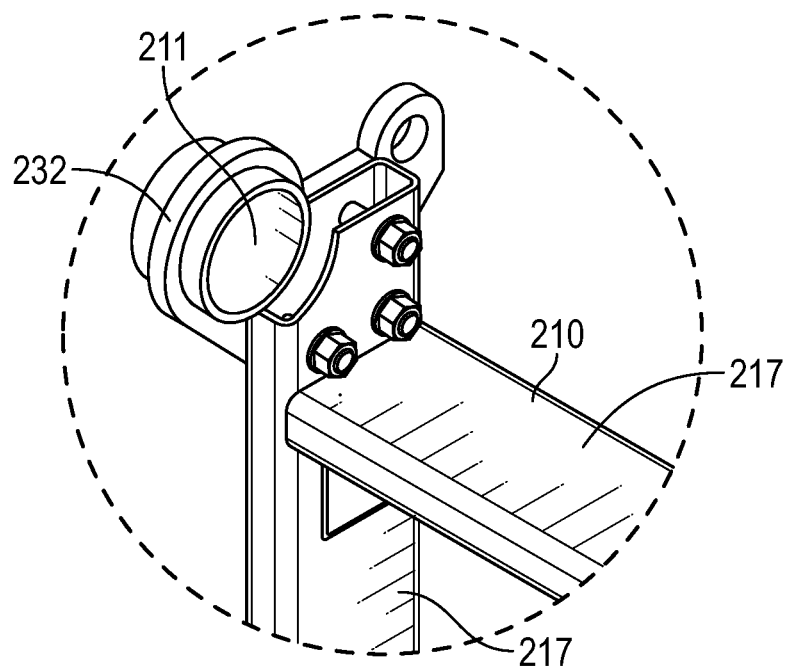
Figure 13C:
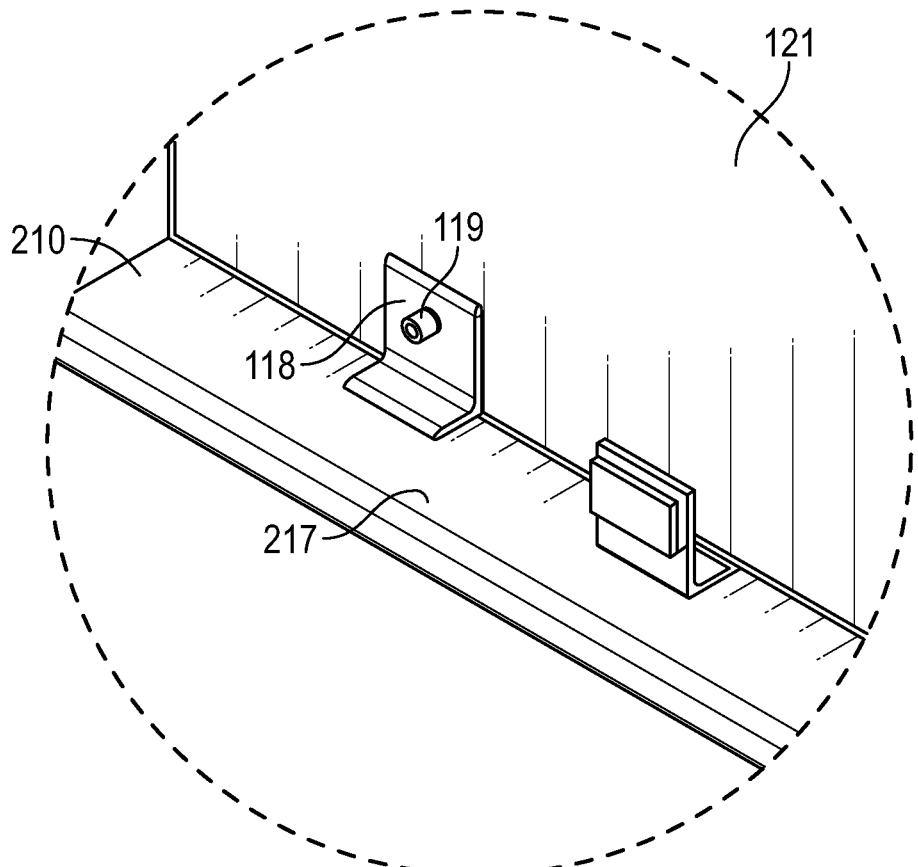
Figure 13D:
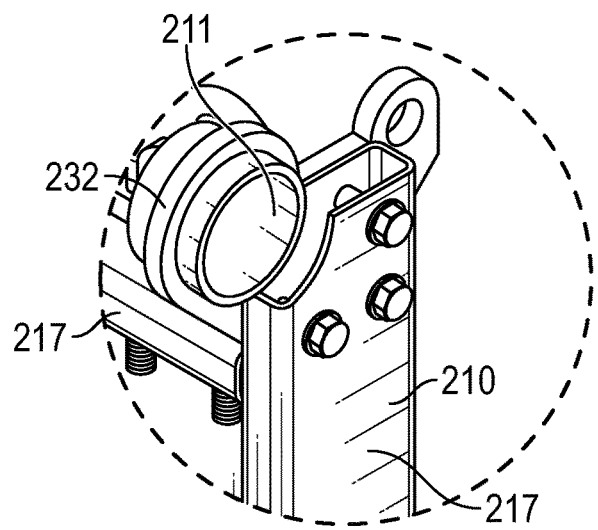

As shown in FIG. 13C, the sheet 121 may be connected to the panel frame 210, such as to the frame member 217, via the clip 118. The clip 118 may be L-shaped and attach the sheet 121 to the frame member 217. A fastener 119 may be used to secure the clip 119 to the sheet 121. The clip 119 may secure to the sheet 121 and/or to the frame member 217 via mechanical attachment, adhesive, friction fit, or other suitable means. Multiple such clips 119 may be used along the outer edges of the sheet 121. Such arrangements may be used for the panel frames 212, 214 as well.

Some uniquely desirable features of the system 10 include portability, security and robust design. A multitude of solar panels are folded into a thin, flat space. There are no exposed wires that can be easily pulled or cut with a knife. The solar panels are enclosed in the hard solar panel frame 201 and protected from exposure to weather, vandalism and theft during transportation and storage when not deployed. When the system is deployed, the protective sheeting 117 is used to hinder access and reduce risk of theft of the solar panels. The system 10 may be used by towing the system to a remote site, lifting the wheels off the ground to prevent theft, tilting the solar array(s) using the linear actuator(s), deploying the lower solar panel(s) using the primary hinge(s), deploying the upper solar panel(s) using the secondary hinge(s), turning on the power electronics, collecting solar energy, converting and storing the energy in batteries, and/or providing electrical power to one or more electrical devices. The steps may be carried out in a variety of orders, and some steps may be omitted. For example, the solar panels may be unfolded first, and then the planar array tilted. Or the upper solar panels may be deployed prior to the lower panels, etc.

Thus, any method sequences are illustrative only. A person of skill in the art will understand that the steps, decisions, and processes embodied in the flowcharts described herein may be performed in any suitable order other than that described herein. Thus, the particular methods and descriptions are not intended to limit the associated processes to being performed in the specific order described.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Any and all references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several methods and materials of embodiments of the present invention. Embodiments of this invention are amenable to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A mobile, solar-powered electrical generation system comprising:
    a mobile platform having two or more wheels and being configured to attach to a vehicle to tow the mobile platform;
    a base carried by the mobile platform and comprising a closed volume enclosing power electronics, the base comprising a plurality of solar modules that at least partially form the closed volume, wherein each solar module comprises:
        a base frame comprising frame members and sidewalls supported by the frame members, each base frame supported by the mobile platform;
        two or more panel frames rotatably attached to each other and supported by the base frame; and
        two or more solar panels, each solar panel supported by a respective panel frame, wherein the two or more panel frames are configured to rotate to deploy from a stowed configuration where solar energy collecting sides of the two or more solar panels are not exposed, to a deployed configuration where the two or more solar panels are exposed and form a planar solar array configured to collect solar energy from the sun,
    wherein each solar module of the plurality of solar modules is configured to connect with at least one other solar module of the plurality of solar modules to modularly expand the base, with each base frame of each solar module supported by the mobile platform, and the two or more panel frames of each solar module forming a solar panel support frame that supports the planar solar array in the deployed configuration; and
    a primary hinge rotatably connecting first and second panel frames of the two or more panel frames to each other, and wherein the primary hinge also is rotatably connecting the first and second panel frames to the base such that the deployed planar solar array can rotate about the primary hinge relative to the base,
    wherein the primary hinge further comprises rigid arms extending away from the base and comprising openings therethrough, and a tube extending through the openings of the rigid arms, such that the rigid arms are rotatably mounted to the tube to connect the primary hinge to the base,
    wherein the primary hinge further comprises a plurality of brackets attached to opposing edges of the first and second panel frames and each bracket having an opening extending therethrough, wherein the tube extends through the respective opening of the plurality of brackets to rotatably connect the first panel frame to the second panel frame, and
    wherein a first bracket of the plurality of brackets is attached to the first panel frame, a second bracket of the plurality of brackets is attached to the second panel frame, and wherein the first and second brackets are offset from each other in a direction parallel to an axis of rotation of the primary hinge.

2. The system of claim 1, further comprising a secondary hinge rotatably connecting the second panel frame to a third panel frame of the two or more panel frames, the secondary hinge comprising a plurality of brackets and a tube, wherein the plurality of brackets are attached to opposing edges of the second and third panel frames and each bracket has an opening extending therethrough, and wherein the tube extends through the respective opening of the plurality of brackets to rotatably connect the second panel frame to the third panel frame.

3. The system of claim 1, further comprising a linear actuator attached to the base, and to one or more panel frames of the two or more panel frames, the linear actuator configured to extend a selected distance to rotate the planar solar array about a hinge to a selected angle to face the sun.

4. The system of claim 3, further comprising a locking mechanism comprising a pin and first and second brackets extending from respective opposing edges of two adjacent panel frames of the two or more panel frames, the brackets having openings configured to align and to receive the pin therethrough to lock the position of the two adjacent panel frames relative to each other in the deployed configuration.

5. The system of claim 1, wherein the base comprises three solar modules, and the two or more panel frames of each solar module comprises two solar panels.

6. A mobile, solar-powered electrical generation system comprising:
   one or more solar modules, each solar module comprising:
      a base frame comprising frame members and sidewalls supported by the frame members;
      two or more panel frames rotatably attached to each other to form a solar panel support frame and supported by the base frame;
      two or more solar panels, each solar panel supported by a respective panel frame, wherein the two or more panel frames are configured to rotate to deploy from a stowed configuration where solar energy collecting sides of the two or more solar panels are not exposed, to a deployed configuration where the two or more solar panels are exposed and form a solar array configured to collect solar energy from the sun; and
      a primary hinge rotatably connecting first and second panel frames of the two or more panel frames to each other, and wherein the primary hinge also is rotatably connecting the solar panel support frame to the base such that the deployed planar solar array can rotate about the primary hinge relative to the base;
   wherein each solar module of the plurality of solar modules is configured to connect with at least one other solar module of the plurality of solar modules to modularly expand the base,
   wherein the primary hinge further comprises rigid arms extending away from the base frame and comprising openings therethrough and a tube extending through the openings of the rigid arms, such that the rigid arms are rotatably mounted to the tube to connect the primary hinge to the base frame,
   wherein the primary hinge further comprises a plurality of brackets attached to opposing edges of the first and second panel frames and each bracket having an opening extending therethrough, wherein the tube extends through the respective opening of the plurality of brackets to rotatably connect the first panel frame to the second panel frame, and
   wherein a first bracket of the plurality of brackets is attached to the first panel frame, a second bracket of the plurality of brackets is attached to the second panel frame, and wherein the first and second brackets are offset from each other in a direction parallel to an axis of the tube.

7. The system of claim 6, further comprising a secondary hinge rotatably connecting the second panel frame to a third panel frame of the two or more panel frames, the secondary hinge comprising a plurality of brackets and a second tube, wherein the plurality of brackets are attached to opposing edges of the second and third panel frames and each bracket has an opening extending therethrough, and wherein the second tube extends through the respective opening of the plurality of brackets to rotatably connect the second panel frame to the third panel frame.

8. The system of claim 6, further comprising a linear actuator attached to the base frame and to one or more panel frames of the two or more panel frames, the linear actuator configured to extend a selected distance to rotate the planar solar array about the primary hinge to a selected angle relative to the base frame.

* * * * *